(12) United States Patent
Ishida et al.

(10) Patent No.: US 8,841,353 B2
(45) Date of Patent: Sep. 23, 2014

(54) CARBON-CONTAINING MODIFIED POLYSTYRENE TYPE RESIN PARTICLE, FOAMABLE CARBON-CONTAINING MODIFIED POLYSTYRENE TYPE RESIN PARTICLE, CARBON-CONTAINING MODIFIED POLYSTYRENE TYPE RESIN FOAMED PARTICLE, CARBON-CONTAINING MODIFIED POLYSTYRENE TYPE RESIN FOAMED MOLDED PRODUCT, AND PRODUCTION METHODS THEREOF

(75) Inventors: Shinji Ishida, Ritto (JP); Masahiko Ozawa, Koka (JP)

(73) Assignee: Sekisui Plastics Co., Ltd., Osaka (JP)

( * ) Notice: Subject to any disclaimer, the term of this patent is extended or adjusted under 35 U.S.C. 154(b) by 535 days.

(21) Appl. No.: 12/593,135

(22) PCT Filed: Dec. 27, 2007

(86) PCT No.: PCT/JP2007/075171
§ 371 (c)(1),
(2), (4) Date: Sep. 25, 2009

(87) PCT Pub. No.: WO2008/117504
PCT Pub. Date: Oct. 2, 2008

(65) Prior Publication Data
US 2010/0063170 A1 Mar. 11, 2010

(30) Foreign Application Priority Data

Mar. 27, 2007 (JP) .................................. 2007-082128
Mar. 27, 2007 (JP) .................................. 2007-082129

(51) Int. Cl.
| | |
|---|---|
| *C08J 9/16* | (2006.01) |
| *C08L 23/12* | (2006.01) |
| *C08J 9/00* | (2006.01) |
| *C08J 9/18* | (2006.01) |
| *C08F 257/02* | (2006.01) |
| *C08L 23/10* | (2006.01) |
| *C08L 51/06* | (2006.01) |
| *C08F 255/02* | (2006.01) |
| *C08J 5/00* | (2006.01) |
| *C08L 51/00* | (2006.01) |
| *B82Y 30/00* | (2011.01) |
| *C08L 25/06* | (2006.01) |

(52) U.S. Cl.
CPC ............ *C08F 257/02* (2013.01); *C08J 9/0071* (2013.01); *C08J 9/18* (2013.01); *C08L 25/06* (2013.01); *C08L 23/10* (2013.01); *C08L 51/06* (2013.01); *C08J 2351/00* (2013.01); *C08J 2325/04* (2013.01); *C08J 9/0061* (2013.01); *C08F 255/02* (2013.01); *C08J 5/005* (2013.01); *C08J 2423/00* (2013.01); *C08L 51/003* (2013.01); *B82Y 30/00* (2013.01); *C08J 9/0066* (2013.01)

USPC .............. 521/56; 521/59; 521/60; 521/100; 521/134; 521/142; 521/146; 525/192; 525/193; 525/194

(58) Field of Classification Search
CPC ........ C08F 255/02; C08F 257/02; C08J 5/005; C08J 9/0061; C08J 9/0066; C08J 9/0071; C08J 9/18; C08J 2325/04; C08J 2351/00; C08J 2423/00; C08L 23/10; C08L 51/003; C08L 51/06; C08L 25/06
USPC .............. 521/56, 59, 60, 100, 134, 139, 142, 521/146; 525/192, 193, 194
See application file for complete search history.

(56) References Cited

U.S. PATENT DOCUMENTS

| | | | |
|---|---|---|---|
| 4,303,756 A | 12/1981 | Kajimura et al. | |
| 6,051,617 A | 4/2000 | Sasaki et al. | |
| 2005/0154115 A1* | 7/2005 | Krupinski | 524/458 |
| 2006/0217452 A1* | 9/2006 | Inada et al. | 521/142 |
| 2009/0274890 A1 | 11/2009 | Ishida et al. | |

FOREIGN PATENT DOCUMENTS

| | | |
|---|---|---|
| CN | 1572823 A | 2/2005 |
| EP | 1 486 531 A1 | 12/2004 |
| JP | 55-110130 A | 8/1980 |
| JP | 61-37830 A | 2/1986 |
| JP | 61-9432 B2 | 3/1986 |
| JP | 1-278539 A | 11/1989 |
| JP | 2-284905 A | 11/1990 |
| JP | 5-54854 B2 | 8/1993 |
| JP | 6-136172 A | 5/1994 |
| JP | 9-194623 A | 7/1997 |

(Continued)

OTHER PUBLICATIONS

Supplementary European Search Report for the Application No. EP 07 86 0393 dated Mar. 25, 2010.

(Continued)

*Primary Examiner* — Irina S Zemel
(74) *Attorney, Agent, or Firm* — Cheng Law Group, PLLC

(57) ABSTRACT

A carbon-containing modified polystyrene type resin particle of the present invention includes: a carbon-containing polypropylene type resin, and a polystyrene type resin in an amount of not less than 100 parts by weight but less than 400 parts by weight per 100 parts by weight of the carbon-containing polypropylene type resin, wherein the polystyrene type resin ratio at the central part of the particle is at least 1.2 times the polystyrene type resin ratio of the overall particle, the polystyrene type resin ratio being calculated by using the ratio (D698/D1376) of absorbances at 698 cm$^{-1}$ and 1376 cm$^{-1}$ which are obtained by infrared absorption spectra measured by ATR infrared spectroscopic analysis.

19 Claims, 1 Drawing Sheet

(56) References Cited

FOREIGN PATENT DOCUMENTS

| | | |
|---|---|---|
| JP | 9-255879 A | 9/1997 |
| JP | 10-292064 A | 11/1998 |
| JP | 11-12382 A | 1/1999 |
| JP | 2004-211042 A | 7/2004 |
| JP | 2005-97555 A | 4/2005 |
| JP | 2006-70202 A | 3/2006 |
| JP | 2006-83221 A | 3/2006 |
| JP | 2006-88456 A | 4/2006 |
| JP | 2006-111862 A | 4/2006 |
| JP | 2006-257150 A | 9/2006 |
| JP | 2009-75076 A | 4/2008 |
| TW | 200516103 | 5/2005 |
| TW | 200610811 | 4/2006 |
| TW | 200617078 | 6/2006 |
| WO | WO-2004/085527 A1 | 10/2004 |
| WO | WO-2006/027943 A1 | 3/2006 |
| WO | WO-2006/027944 A1 | 3/2006 |
| WO | WO-2007/099833 A1 | 9/2007 |

OTHER PUBLICATIONS

International Search Report for the Application No. PCT/JP2007/075171 mailed Feb. 5, 2008.

Taiwanese Office Action for the Application No. 096150722 dated Dec. 8, 2011.

* cited by examiner

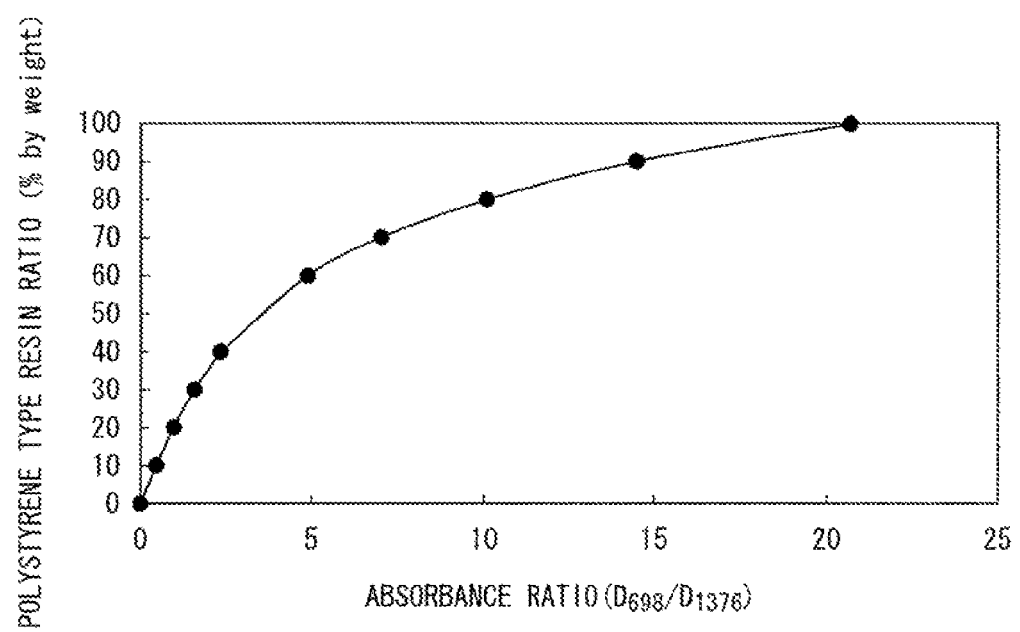

CARBON-CONTAINING MODIFIED POLYSTYRENE TYPE RESIN PARTICLE, FOAMABLE CARBON-CONTAINING MODIFIED POLYSTYRENE TYPE RESIN PARTICLE, CARBON-CONTAINING MODIFIED POLYSTYRENE TYPE RESIN FOAMED PARTICLE, CARBON-CONTAINING MODIFIED POLYSTYRENE TYPE RESIN FOAMED MOLDED PRODUCT, AND PRODUCTION METHODS THEREOF

TECHNICAL FIELD

The present invention relates to a carbon-containing modified polystyrene type resin particle obtained by polymerizing a styrene using a carbon-containing polypropylene type resin as a nucleus, a foamable carbon-containing modified polystyrene type resin particle obtained by impregnating the carbon-containing modified polystyrene type resin particle with a foaming agent, a carbon-containing modified polystyrene type resin foamed particle obtained by pre-foaming the foamable particle, a carbon-containing modified polystyrene type resin foamed molded product obtained by subjecting the foamed particle to in-mold foam molding, and production methods thereof.

Priority is claimed on Japanese Patent Application No. 2007-082128, filed Mar. 27, 2007, and Japanese Patent Application No. 2007-082129, filed Mar. 27, 2007, the contents of which are incorporated herein by reference.

BACKGROUND ART

Conventionally, polystyrene type resin foamed molded products obtained by packing the inside of a mold with polystyrene type resin pre-foamed particles and subsequently conducting heating and foaming are known to exhibit excellent rigidity, thermal insulation properties, lightweight properties, water resistance, and foam moldability. As a result, these foamed molded products are widely used as cushioning materials and thermal insulation materials for construction materials. However, these foamed molded products tend to suffer from poor levels of chemical resistance and impact resistance.

On the other hand, foamed molded products formed from polypropylene type resins are known to exhibit excellent chemical resistance and impact resistance. Accordingly, these foamed molded products are used in automotive components. However, because polypropylene type resins exhibit inferior retention of the foaming gas, the foam molding conditions must be controlled very precisely, which creates a problem of increased production costs. In addition, polypropylene type resin foamed molded products tend to exhibit inferior rigidity to polystyrene type resin foamed molded products.

In order to address these problems associated with polystyrene type resins and polypropylene type resins, foamed molded products containing a composite of a polystyrene type resin having favorable rigidity and foam moldability, and a polypropylene type resin having favorable chemical resistance and impact resistance have been proposed (for example, see Patent Documents 1 to 4).

Patent Document 1 has an object of providing a foamed molded product with practically applicable levels of impact resistance, rigidity and surface properties and the like, and discloses a method of obtaining pre-foamed particles formed from a modified polypropylene type resin composition obtained by heating an aqueous suspension containing 100 parts by weight of a polypropylene (a), 1 to 500 parts by weight of a vinyl type monomer component (b) per 100 parts by weight of the polypropylene (a), and 0.01 to 10 parts by weight of a radical polymerization initiator (c) per 100 parts by weight of the vinyl type monomer component (b), in some cases under conditions in which the vinyl type monomer component (b) undergoes no substantial homopolymerization, subsequently impregnating the polypropylene (a) with the vinyl type monomer component (b), and then further heating the aqueous suspension to at least a temperature at which the crystalline portion of the polypropylene (a) begins to melt substantially, thereby polymerizing the vinyl type monomer component (b).

Patent Document 2 discloses a method of obtaining spherical polypropylene type resin particles, the method including: dispersing 100 parts by weight of pellets or a powder of a propylene type resin containing from 1 to 10% by weight of an ethylene component in an aqueous suspension, adding approximately 30 to 150 parts by weight of a styrene type monomer to the suspension and heating at a temperature of 130° C. or higher, and then conducting a polymerization in the presence of a polymerization catalyst.

Moreover, depending on the intended application for the foamed molded product, it may be desirable to have the product colored black in some cases, and carbon is well known as a black colorant in such cases. However, it is also known that this carbon slows the polymerization of the styrene type monomer and can cause incomplete polymerization. In order to overcome this problem, methods have been proposed in which a polymerization initiator containing a polymerization initiator that generates tertiary alkoxy radicals as the main component is used to obtain a black styrene-modified polyethylene type resin foamed particle (for example, see Patent Documents 5 and 6).

In Patent Document 5, specific examples of the polymerization initiator include dicumyl peroxide, n-butyl-4,4-bis(t-butylperoxy)valerate, and 1,1-bis(t-butylperoxy)-3,3,5-trimethylcyclohexane.

Patent Document 6 discloses the combined use of a first polymerization initiator that generates tertiary alkoxy radicals and has a 10-hour half-life temperature of not more than 100° C., and a second polymerization initiator composed of 2,2-bis(t-butylperoxy)butane as the polymerization initiator. Specific examples of the first polymerization initiator include t-butylperoxy-2-ethylhexanoate, t-amylperoxy-2-ethylhexanoate, t-butylperoxy isobutyrate, 1,1,3,3-tetramethylbutylperoxy-2-ethylhexanoate, 1,1,3,3-tetramethylbutylperoxy-3,5,5-trimethylhexanoate, and di-t-butylperoxy hexahydroterephthalate.

Furthermore, the use of composite flame retardants containing a combination of a flame retardant and a flame retardant assistant to impart styrene type resins with self-extinguishing properties is already known. Examples of the flame retardant include tetrabromocyclooctane, hexabromocyclododecane, tetrabromobisphenol A diallyl ether, and tri(2,3-dibromopropyl) isocyanate. Further, examples of the flame retardant assistant include 2,3-dimethyl-2,3-diphenylbutane, 3,4-dimethyl-3,4-diphenylhexane, dicumyl peroxide, and cumene hydroperoxide. A multitude of styrene type resins that have been provided with self-extinguishing properties by using the above flame retardants and flame retardant assistants have been disclosed.

Patent Document 7 discloses a flame retardant thermoplastic resin composition in which a halogen-based flame retardant, a phosphorus-based flame retardant or an inorganic flame retardant or the like has been blended, as a flame retardant, into a styrene type resin.

Patent Document 8 discloses a self-extinguishing type foamable styrene type resin particle prepared by blending a styrene type resin particle with a composite flame retardant formed from the flame retardant tris(2,3-dibromopropyl) isocyanurate and a flame retardant assistant composed of 2,3-dimethyl-2,3-diphenylbutane or 3,4-dimethyl-3,4-diphenylhexane.

However, in the modified resin particles obtained using the methods disclosed in Patent Documents 1 and 2, ensuring that the polypropylene type resin exists in large amounts near the surface portion of the particles (namely, the polystyrene type resin exists largely within the central portion of the particles) has proven particularly difficult, meaning achieving satisfactory chemical resistance is problematic. Furthermore, a foamed molded product produced by conducting foam molding using the modified resin particles obtained via one of these methods tends to lack satisfactory heat resistance.

Furthermore, achieving satisfactory completion of the polymerization of a styrene type monomer is difficult even when a polymerization initiator disclosed in Patent Document 5 or 6 is used, and as a result, a foamed molded product having the targeted degree of blackness tends to be unattainable. In the case of applications such as members for use inside vehicles, the coloring of the product is particularly important, meaning a modified resin particle capable of providing an attractive foamed molded product has been keenly sought.

Moreover, in a styrene-modified polyethylene type resin foamed particle, if a large amount of polystyrene exists at the surface of the particle, then a satisfactory degree of blackness cannot be obtained even if carbon is added, and because polystyrene exists largely at the particle surface in the black styrene-modified polyethylene type resin foamed particles disclosed in Patent Documents 5 and 6, the degree of blackness tends to be inadequate.

Furthermore, even if the flame retardants and flame retardant assistants disclosed in Patent Documents 7 and 8 are impregnated into the foamed molded product disclosed in Patent Documents 1 to 4, a foamed molded product that exhibits self-extinguishing properties while retaining favorable levels of rigidity, foam moldability, chemical resistance, heat resistance and blackness can still not be realized.

[Patent Document 1]
Japanese Unexamined Patent Application, First Publication No. Hei 9-194623
[Patent Document 2]
Japanese Unexamined Patent Application, First Publication No. Sho 61-9432
[Patent Document 3]
Japanese Unexamined Patent Application, First Publication No. 2006-70202
[Patent Document 4]
Japanese Unexamined Patent Application, First Publication No. 2005-97555
[Patent Document 5]
Japanese Examined Patent Application, Second Publication No. Hei 5-54854
[Patent Document 6]
Japanese Unexamined Patent Application, First Publication No. 2006-111862
[Patent Document 7]
Japanese Unexamined Patent Application, First Publication No. Hei 9-255879
[Patent Document 8]
Japanese Unexamined Patent Application, First Publication No. 2004-211042

DISCLOSURE OF INVENTION

Problems to be Solved by the Invention

The present invention takes the above circumstances into consideration, with an object of providing a carbon-containing modified polystyrene type resin foamed molded product that remedies the drawbacks associated with both polystyrene type resin foamed molded products and polypropylene type resin foamed molded products, and exhibits excellent chemical resistance, heat resistance, and foam moldability and the like. Further, another object of the present invention is to provide a carbon-containing polystyrene type resin foamed molded product having self-extinguishing properties.

Means to Solve the Problems

In order to achieve the above objects, the present invention provides:
a carbon-containing modified polystyrene type resin particle that includes
a carbon-containing polypropylene type resin, and
a polystyrene type resin in an amount of not less than 100 parts by weight but less than 400 parts by weight per 100 parts by weight of the carbon-containing polypropylene type resin, wherein
the polystyrene type resin ratio at the central part of the particle is at least 1.2 times the polystyrene type resin ratio of the overall particle, the polystyrene type resin ratio being calculated by using the ratio $(D_{698}/D_{1376})$ of absorbances at 698 $cm^{-1}$ and 1376 $cm^{-1}$ which are obtained from an infrared absorption spectrum measured by ATR infrared spectroscopic analysis.

The carbon-containing modified polystyrene type resin particle of the present invention preferably contains not less than 1.5 parts by weight but less than 6 parts by weight of a flame retardant per 100 parts by weight of the carbon-containing polystyrene type resin particle.

Further, the carbon-containing modified polystyrene type resin particle of the present invention preferably contains not less than 1.5 parts by weight but less than 6 parts by weight of a flame retardant, and not less than 0.1 parts by weight but less than 3 parts by weight of a flame retardant assistant, per 100 parts by weight of the carbon-containing polystyrene type resin particle.

Further, in the carbon-containing modified polystyrene type resin particle of the present invention, the ratio $(D_{698}/D_{1376})$ of absorbances at 698 $cm^{-1}$ and 1376 $cm^{-1}$ obtained from an infrared absorption spectrum of the particle surface measured by ATR infrared spectroscopic analysis is preferably within a range from 0.1 to 2.5.

Furthermore, in the carbon-containing modified polystyrene type resin particle of the present invention, the average particle size of the carbon within the carbon-containing polypropylene type resin is preferably within a range from 15 to 35 nm prior to incorporation within the polypropylene type resin, and carbon particles are contained at 1 to 8% by weight.

Further, in the carbon-containing modified polystyrene type resin particle of the present invention, the flame retardant is preferably tri(2,3-dibromopropyl) isocyanate, and the flame retardant assistant preferably includes one or more compounds selected from the group consisting of 2,3-dimethyl-2,3-diphenylbutane, 3,4-dimethyl-3,4-diphenylhexane, dicumyl peroxide, and cumene hydroperoxide.

Furthermore, the present invention also provides a foamable carbon-containing modified polystyrene type resin particle prepared by impregnating the above carbon-containing modified polystyrene type resin particle with a foaming agent.

Moreover, the present invention also provides a carbon-containing modified polystyrene type resin foamed particle prepared by pre-foaming the above foamable carbon-containing modified polystyrene type resin particle.

Furthermore, the present invention also provides a carbon-containing modified polystyrene type resin foamed molded product produced by packing the above carbon-containing modified polystyrene type resin foamed particle into a mold and conducting foam molding.

Further, in the carbon-containing modified polystyrene type resin foamed molded product of the present invention, the shrinkage factor in a dimensional change measurement conducted in accordance with JIS K 6767 under conditions at 80° C. is preferably not more than 1.0%, the foam expansion ratio is preferably within a range from 20-fold to 40-fold, and the density is preferably within a range from 0.025 to 0.05 g/cm$^3$.

Furthermore, the present invention also provides a method of producing a carbon-containing modified polystyrene type resin particle, the method including:

dispersing 100 parts by weight of a carbon-containing polypropylene type resin particle, not less than 100 parts by weight but less than 400 parts by weight of a styrene type monomer, and a polymerization initiator within an aqueous suspension containing a dispersant, heating the resulting dispersion to a temperature at which the styrene type monomer undergoes substantially no polymerization, thereby impregnating the carbon-containing polypropylene type resin particle with the styrene type monomer, performing a first polymerization of the styrene type monomer at a temperature within a range from $(T-10)°$ C. to $(T+20)°$ C., wherein $T°$ C. represents the melting point of the carbon-containing polypropylene type resin particle, and following the first polymerization, adding a styrene type monomer and a polymerization initiator, and then heating to a temperature within a range from $(T-25)°$ C. to $(T+10)°$ C., thereby impregnating the carbon-containing polypropylene type resin particle with the styrene type monomer and performing a second polymerization.

The method of producing a carbon-containing modified polystyrene type resin particle of the present invention preferably also includes impregnating the resin particle with a flame retardant, either during the second polymerization or after completion of the second polymerization.

Furthermore, the method of producing a carbon-containing modified polystyrene type resin particle of the present invention preferably also includes impregnating the resin particle with a flame retardant and a flame retardant assistant, either during the second polymerization or after completion of the second polymerization.

Moreover, in the method of producing a carbon-containing modified polystyrene type resin particle of the present invention, the melting point of the polypropylene type resin within the carbon-containing polypropylene type resin is preferably within a range from 120 to 145° C.

Furthermore, in the method of producing a carbon-containing modified polystyrene type resin particle of the present invention, the polypropylene type resin within the carbon-containing polypropylene type resin is preferably a propylene-ethylene copolymer.

In addition, the present invention also provides a method of producing a foamable carbon-containing modified polystyrene type resin particle that includes impregnating the carbon-containing modified polystyrene type resin particle obtained using the production method described above with a foaming agent to obtain a foamable carbon-containing modified polystyrene type resin particle.

Furthermore, the present invention also provides a method of producing a carbon-containing modified polystyrene type resin foamed particle that includes heating and pre-foaming the foamable carbon-containing modified polystyrene type resin particle obtained using the above production method to obtain a foamed particle.

Moreover, the present invention also provides a method of producing a carbon-containing modified polystyrene type resin foamed molded product that includes: packing the carbon-containing modified polystyrene type resin foamed particle obtained using the above production method into the cavity of a molding die, subsequently performing in-mold foam molding, and then releasing the foamed molded product from the molding die.

Effect of the Invention

The carbon-containing modified polystyrene type resin particle of the present invention contains 100 parts by weight of a carbon-containing polypropylene type resin and not less than 100 parts by weight but less than 400 parts by weight of a polystyrene type resin, wherein the polystyrene type resin ratio at the central part of the particle is at least 1.2 times the polystyrene type resin ratio of the overall particle, the polystyrene type resin ratio being calculated by using the ratio ($D_{698}/D_{1376}$) of absorbances at 698 cm$^{-1}$ and 1376 cm$^{-1}$ which are obtained from an infrared absorption spectrum measured by ATR infrared spectroscopic analysis. As a result, a carbon-containing modified polystyrene type resin foamed molded product obtained by impregnating the carbon-containing modified polystyrene type resin particle with a foaming agent, conducting pre-foaming of the resulting foamable modified polystyrene type resin particle, and then packing the pre-foamed particle in a molding die and performing foam molding combines the advantages of a polystyrene type resin foamed molded product and a polypropylene type resin foamed molded product, and is a foamed molded product that exhibits excellent levels of rigidity, foam moldability, chemical resistance, heat resistance and degree of blackness. Furthermore, in those cases where the carbon-containing modified polystyrene type resin particle of the present invention also contains not less than 1.5 parts by weight but less than 6 parts by weight of a flame retardant, and/or not less than 0.1 parts by weight but less than 3 parts by weight of a flame retardant assistant, per 100 parts by weight of the carbon-containing polypropylene type resin particle, the resulting carbon-containing modified polystyrene type resin foamed molded product not only retains the favorable properties listed above, but also exhibits self-extinguishing properties. Accordingly, the present invention is able to provide a carbon-containing modified polystyrene type resin particle that is ideal for producing a foamed molded product having these superior physical properties.

The foamable carbon-containing modified polystyrene type resin particle of the present invention is prepared by impregnating the abovementioned carbon-containing modified polystyrene type resin particle with a foaming agent, and is therefore able to provide a foamable carbon-containing modified polystyrene type resin particle that is ideal for producing a foamed molded product that exhibits excellent levels of rigidity, foam moldability, chemical resistance, heat resistance and blackness. Further, in those cases where the carbon-containing modified polystyrene type resin particle of the present invention also contains a flame retardant and/or a flame retardant assistant, a foamable carbon-containing modified polystyrene type resin particle can be provided that is ideal for producing a foamed molded product that not only retains the favorable properties listed above, but also exhibits self-extinguishing properties.

The carbon-containing modified polystyrene type resin foamed particle of the present invention is produced by pre-foaming the abovementioned foamable carbon-containing modified polystyrene type resin particle, and is therefore able to provide a carbon-containing modified polystyrene type resin foamed particle that is ideal for producing a foamed molded product that exhibits excellent levels of rigidity, foam moldability, chemical resistance, heat resistance and blackness. Further, in those cases where the carbon-containing modified polystyrene type resin particle of the present invention also contains a flame retardant and/or a flame retardant assistant, a carbon-containing modified polystyrene type resin foamed particle can be provided that is ideal for producing a foamed molded product that not only retains the favorable properties listed above, but also exhibits self-extinguishing properties.

The carbon-containing modified polystyrene type resin foamed molded product of the present invention is obtained by packing the abovementioned carbon-containing modified polystyrene type resin foamed particle into a mold, and then performing foam molding, and is therefore able to provide a carbon-containing modified polystyrene type resin foamed molded product that exhibits excellent levels of rigidity, foam moldability, chemical resistance, heat resistance and blackness. Further, in those cases where the carbon-containing modified polystyrene type resin particle of the present invention also contains a flame retardant and/or a flame retardant assistant, a carbon-containing modified polystyrene type resin foamed molded product can be provided that not only retains the favorable properties listed above, but also exhibits self-extinguishing properties.

The method of producing a carbon-containing modified polystyrene type resin particle according to the present invention includes: dispersing 100 parts by weight of a carbon-containing polypropylene type resin particle, not less than 100 parts by weight but less than 400 parts by weight of a styrene type monomer, and a polymerization initiator within an aqueous suspension containing a dispersant, heating the resulting dispersion to a temperature at which the styrene type monomer undergoes substantially no polymerization, thereby impregnating the carbon-containing polypropylene type resin particle with the styrene type monomer, subsequently performing a first polymerization of the styrene type monomer at a temperature within a range from $(T-10)°$ C. to $(T+20)°$ C., wherein $T°$ C. represents the melting point of the carbon-containing polypropylene type resin particle, and following the first polymerization, adding a styrene type monomer and a polymerization initiator, and then heating to a temperature within a range from $(T-25)°$ C. to $(T+10)°$ C., thereby performing a second polymerization of the styrene type monomer. As a result, a carbon-containing modified polystyrene type resin particle can be produced for which the polystyrene type resin ratio at the central part of the particle is at least 1.2 times the polystyrene type resin ratio of the overall particle, wherein the polystyrene type resin ratio is calculated by using the ratio $(D_{698}/D_{1376})$ of absorbances at 698 $cm^{-1}$ and 1376 $cm^{-1}$ which are obtained from an infrared absorption spectrum measured by ATR infrared spectroscopic analysis.

Furthermore, in those cases where the method of producing a carbon-containing modified polystyrene type resin particle of the present invention also includes impregnating the resin particle with a flame retardant and/or a flame retardant assistant, either during the second polymerization or after completion of the second polymerization, a carbon-containing modified polystyrene type resin particle can be produced that not only has the features described above, but also contains not less than 1.5 parts by weight but less than 6 parts by weight of a flame retardant, and/or not less than 0.1 parts by weight but less than 3 parts by weight of a flame retardant assistant, per 100 parts by weight of the carbon-containing polystyrene type resin particle.

In those cases where the foamable carbon-containing modified polystyrene type resin particle obtained by impregnating the carbon-containing modified polystyrene type resin particle with a foaming agent is subjected to pre-foaming, and the resulting pre-foamed particle is then packed inside a molding die and subjected to foam molding, a foamed molded product can be obtained that combines the advantages of a polystyrene type resin foamed molded product and a polypropylene type resin foamed molded product, and exhibits excellent levels of rigidity, foam moldability, chemical resistance, heat resistance and degree of blackness. Furthermore, in those cases where the obtained carbon-containing modified polystyrene type resin particle contains a flame retardant and/or a flame retardant assistant, a foamable carbon-containing modified polystyrene type resin particle can be obtained that is ideal for producing a foamed molded product that not only retains the favorable properties listed above, but also exhibits self-extinguishing properties. Accordingly, the production method of the present invention is able to provide a carbon-containing modified polystyrene type resin particle that is ideal for producing a foamed molded product having the abovementioned superior physical properties.

The method of producing a foamable carbon-containing modified polystyrene type resin particle according to the present invention involves impregnating the abovementioned carbon-containing modified polystyrene type resin particle with a foaming agent to produce the foamable carbon-containing modified polystyrene type resin particle, and is therefore capable of providing a foamable carbon-containing modified polystyrene type resin particle that is ideal for producing a foamed molded product that exhibits excellent levels of rigidity, foam moldability, chemical resistance, heat resistance and blackness. Furthermore, in those cases where the abovementioned carbon-containing modified polystyrene type resin particle contains a flame retardant and/or a flame retardant assistant, a foamable carbon-containing modified polystyrene type resin particle can be provided that is ideal for producing a foamed molded product that not only retains the favorable properties listed above, but also exhibits self-extinguishing properties.

The method of producing a carbon-containing modified polystyrene type resin foamed particle according to the present invention involves pre-foaming the abovementioned foamable carbon-containing modified polystyrene type resin particle to produce the carbon-containing modified polystyrene type resin foamed particle, and is therefore capable of providing a carbon-containing modified polystyrene type resin foamed particle that is ideal for producing a foamed molded product that exhibits excellent levels of rigidity, foam moldability, chemical resistance, heat resistance and blackness. Furthermore, in those cases where the abovementioned foamable carbon-containing modified polystyrene type resin particle contains a flame retardant and/or a flame retardant assistant, a carbon-containing modified polystyrene type resin foamed particle can be provided that is ideal for producing a foamed molded product that not only retains the favorable properties listed above, but also exhibits self-extinguishing properties.

The method of producing a carbon-containing modified polystyrene type resin foamed molded product of the present invention involves packing the abovementioned carbon-containing modified polystyrene type resin foamed particle into a mold, and performing foam molding to produce the carbon-containing modified polystyrene type resin foamed molded product, and is therefore capable of providing a carbon-containing modified polystyrene type resin foamed molded product that exhibits excellent levels of rigidity, foam moldability, chemical resistance, heat resistance and blackness. Furthermore, in those cases where the abovementioned carbon-containing modified polystyrene type resin foamed particle contains a flame retardant and/or a flame retardant assistant, a carbon-containing modified polystyrene type resin foamed molded product can be provided that not only retains the favorable properties listed above, but also exhibits self-extinguishing properties.

BRIEF DESCRIPTION OF THE DRAWINGS

FIG. 1 is a graphed calibration curve illustrating the relationship between the polystyrene type resin ratio (% by weight) and the absorbance ratio ($D_{698}/D_{1376}$), prepared by using molded products formed from a polystyrene type resin and a polypropylene type resin as standard samples, and measuring the absorbance ratio for these standard samples.

BEST MODE FOR CARRYING OUT THE INVENTION

As a result of conducting intensive research aimed at achieving the objects described above, the inventors of the present invention discovered that by adding a styrene type monomer to a carbon-containing polypropylene type resin particle having a specific melting point and containing a specific carbon, and subsequently polymerizing the styrene type monomer at a temperature within a specific temperature range, a carbon-containing modified polystyrene type resin particle could be obtained that had a larger amount of styrene in the central part of the particle, and a larger amount of the polypropylene type resin near the particle surface.

Moreover, the inventors also discovered that if a carbon-containing modified polystyrene type resin particle produced in this manner was impregnated with a foaming agent, the thus obtained foamable carbon-containing modified polystyrene type resin particle was subjected to pre-foaming, and the resulting foamed particle was then packed in a molding die and subjected to in-mold foam molding, then a carbon-containing modified polystyrene type resin foamed molded product could be produced that combines the advantages of a polypropylene type resin foamed molded product and a polystyrene type resin foamed molded product, and exhibits excellent levels of foam moldability, chemical resistance and heat resistance.

A carbon-containing modified polystyrene type resin particle of the present invention includes 100 parts by weight of a carbon-containing polypropylene type resin, and not less than 100 parts by weight but less than 400 parts by weight of a polystyrene type resin, wherein the polystyrene type resin ratio at the central part of the particle is at least 1.2 times the polystyrene type resin ratio of the overall particle, the polystyrene type resin ratio being calculated by using the ratio ($D_{698}/D_{1376}$) of absorbances at 698 $cm^{-1}$ and 1376 $cm^{-1}$ which are obtained from an infrared absorption spectrum measured by ATR infrared spectroscopic analysis.

In the carbon-containing modified polystyrene type resin particle of the present invention, the "central part of the particle" describes the portion of the particle, in a cross-section that passes through the center of the particle, from the particle center out to a distance ¼ of the particle diameter (particle size) from the particle center. For example, in the case of a spherical particle having a particle diameter of 1 mm, the central part of the particle describes the portion within a radius of 125 μm from the particle center.

There are no particular restrictions on the polypropylene type resin within the carbon-containing polypropylene type resin particle that functions as one of the resin materials for the carbon-containing modified polystyrene type resin particle of the present invention, and resins obtained using conventional polymerization methods may be used. For example, propylene-ethylene copolymers can be used. This propylene-ethylene copolymer contains a copolymer of propylene and ethylene as the main component, but may also include other monomers capable of copolymerizing with the ethylene or propylene within the resin molecules. Examples of these other monomers include either one, or two or more monomers selected from amongst α-olefins, cyclic olefins, and diene type monomers.

In a preferred embodiment of the present invention, a resin having a melting point within a range from 120 to 145° C. is used as the polypropylene type resin. If the melting point of the polypropylene type resin is lower than 120° C., then the heat resistance tends to be poor, and the heat resistance of the modified polystyrene type resin foamed molded product produced using the modified polystyrene type resin particle tends to deteriorate. Further, if the melting point is higher than 145° C., then the polymerization temperature increases, and a favorable polymerization can not be conducted.

In a preferred embodiment of the present invention, examples of the carbon included within the carbon-containing polypropylene type resin include furnace black, Ketchen black, channel black, thermal black, acetylene black, graphite and carbon fiber. Prior to inclusion within the polypropylene type resin, the carbon (raw material carbon) is preferably in particulate form, and the particle diameter of the raw material carbon is preferably within a range from 5 to 100 nm, and more preferably from 15 to 35 nm. The particle diameter for the raw material carbon refers to the average particle diameter, wherein this average particle diameter is an arithmetic average obtained by electron microscope observation. The average particle diameter that defines the carbon black used in the present invention is obtained by measuring the small spherical components that constitute aggregates of the carbon black (which have a microcrystalline contour and cannot be separated) from an electron microscope photograph, and calculating the average value of the thus determined particle diameters.

Furthermore, the carbon within the carbon-containing modified polystyrene type resin particle of the present invention preferably represents from 1 to 8% by weight of the carbon-containing modified polystyrene type resin particle.

If the carbon content within the carbon-containing modified polystyrene type resin particle is less than 1% by weight, then the obtained foamed molded product is unable to exhibit a satisfactory black color, which is undesirable. In contrast, if the carbon content exceeds 8% by weight, then not only does the foamed molded product produced from the carbon-containing modified polystyrene type resin particle tend to suffer from an inferior bulk foam expansion ratio, but the mechanical strength of the foamed molded product also tends to deteriorate, both of which are undesirable.

If required, the polypropylene type resin particle may also include additives such as flame retardants, flame retardant assistants, antioxidants, ultraviolet absorbers, pigments and colorants and the like.

In the carbon-containing modified polystyrene type resin particle of the present invention, the colorant may be either an inorganic pigment or an organic pigment. Examples of inorganic pigments include chromates such as chrome yellow, zinc yellow and barium yellow, ferrocyanide pigments such as Prussian blue, sulfides such as cadmium yellow and cadmium red, oxides such as iron black and red iron oxide, silicates such as ultramarine blue, and titanium oxide and the like. Further, examples of organic pigments include azo pigments such as monoazo pigments, disazo pigments, azo lakes, condensed azo pigments and chelate azo pigments, and polycyclic pigments such as phthalocyanine-based pigments, anthraquinone-based pigments, perylene-based pigments, perinone-based pigments, thioindigo-based pigments, quinacridone-based pigments, dioxazine-based pigments, isoindolinone-based pigments and quinophthalone-based pigments.

An example of a flame retardant that may be included within the carbon-containing modified polystyrene type resin particle of the present invention is tri(2,3-dibromopropyl) isocyanate. The flame retardant is added in an amount within a range from 1.5 to 6 parts by weight per 100 parts by weight of the carbon-containing modified polystyrene type resin particle. The blend amount of the flame retardant is preferably within a range from 2 to 5 parts by weight, and is more preferably from 3 to 4 parts by weight.

If the blend amount of the flame retardant is less than 1.5 parts by weight, then the self-extinguishing properties of the foamed molded product obtained upon secondary foaming of the pre-foamed particles tend to deteriorate. In contrast, if the blend amount of the flame retardant exceeds 6 parts by weight, then the dimensional change upon heating the foamed molded product obtained upon secondary foaming of the pre-foamed particles tends to increase, which is undesirable.

Examples of the flame retardant assistant that may be included within the carbon-containing modified polystyrene type resin particle of the present invention include one or more compounds selected from the group consisting of 2,3-dimethyl-2,3-diphenylbutane, 3,4-dimethyl-3,4-diphenylhexane, and the organic peroxides dicumyl peroxide and cumene hydroperoxide. The flame retardant assistant is added in an amount within a range from 0.1 to 3 parts by weight per 100 parts by weight of the carbon-containing modified polystyrene type resin particle. The blend amount of the flame retardant assistant is preferably within a range from 0.5 to 2.5 parts by weight, and is more preferably from 1 to 2 parts by weight.

If the blend amount of the flame retardant assistant is less than 0.1 parts by weight, then the self-extinguishing properties of the foamed molded product obtained upon secondary foaming of the pre-foamed particle tend to deteriorate. In contrast, if the blend amount of the flame retardant assistant exceeds 3 parts by weight, then the dimensional change upon heating the foamed molded product obtained upon secondary foaming of the pre-foamed particle tends to increase, which is undesirable.

The carbon-containing modified polystyrene type resin particle of the present invention may contain only a flame retardant, or may include both a flame retardant and a flame retardant assistant. Further, in the carbon-containing modified polystyrene type resin particle of the present invention, the flame retardant and flame retardant assistant preferably exist largely at the particle surface, but may also exist within the central part of the particle.

Examples of the polystyrene type resin that functions as the other resin material within the carbon-containing modified polystyrene type resin particle of the present invention include resins obtained by polymerizing a styrene type monomer such as styrene, α-methylstyrene, p-methylstyrene or t-butylstyrene. Moreover, the polystyrene type resin may also be a copolymer of a styrene type monomer and another monomer capable of copolymerization with the styrene type monomer. Examples of this other monomer include polyfunctional monomers such as divinylbenzene, and alkyl(meth)acrylates that contain no benzene ring within their structure, such as butyl(meth)acrylate. These other monomers may be used in a quantity that does not substantially exceed 5% by weight relative to the polystyrene type resin. In this description, both styrenes and the monomers that are capable of copolymerization with styrenes are referred to as styrene type monomers.

The amount of the polystyrene type resin is typically within a range from 100 to 400 parts by mass per 100 parts by mass of the carbon-containing polypropylene type resin particle. The amount of the polystyrene type resin is preferably within a range from 120 to 300 parts by weight, and more preferably from 150 to 250 parts by weight.

If this proportion of the polystyrene type resin exceeds 400 parts by weight, then the chemical resistance and heat resistance properties of the foamed molded product obtained upon secondary foaming of the pre-foamed particle tend to deteriorate. In contrast, if the blend amount is less than 100 parts by weight, then the rigidity of the foamed molded product obtained upon secondary foaming of the pre-foamed particle tends to worsen, which is undesirable.

In the carbon-containing modified polystyrene type resin particle of the present invention, the polystyrene type resin ratio at the central part of the particle is at least 1.2 times, and preferably 1.35 times or greater, and more preferably 1.4 times or greater, the polystyrene type resin ratio of the overall particle, the polystyrene type resin ratio being calculated by using the ratio ($D_{698}/D_{1376}$) of absorbances at 698 cm$^{-1}$ and 1376 cm$^{-1}$ which are obtained from an infrared absorption spectrum measured by ATR infrared spectroscopic analysis.

If the polystyrene type resin ratio at the central part of the particle is less than 1.2 times the polystyrene type resin ratio of the overall particle, then the gradient of the slope that represents the variation in the polystyrene type resin ratio from the surface layer to the particle interior decreases. As a result, the foam expansion ratio and the heat resistance of the foamed molded product obtained upon foam molding of the pre-foamed particle tend to deteriorate, which is undesirable. Further, if the polystyrene type resin ratio at the central part of the particle is less than 1.2 times the polystyrene type resin ratio of the overall particle, then the proportion of the polystyrene type resin at the particle surface increases, making it difficult to achieve a satisfactory degree of blackness for the foamed molded product obtained upon foam molding of the pre-foamed particle.

Moreover, in the carbon-containing modified polystyrene type resin particle of the present invention, the ratio ($D_{698}/D_{1376}$) of absorbances at 698 cm$^{-1}$ and 1376 cm$^{-1}$ obtained from an infrared absorption spectrum of the particle surface measured by ATR infrared spectroscopic analysis is preferably within a range from 0.1 to 2.5, more preferably from 0.8 to 2.0, and still more preferably from 1.0 to 1.5.

The surface of the particle refers to a "surface layer" that includes the region from the surface down to a depth of several μm.

If the absorbance ratio is greater than 2.5, then the proportion of the polyolefin type resin at the surface of the pre-foamed particle decreases. As a result, the chemical resistance and impact resistance of the foamed molded product obtained upon foam molding of the pre-foamed particle tend to deteriorate undesirably. In contrast, if the absorbance ratio is less than 0.1, then because dissipation of the foaming agent from the surface of the pre-foamed particle becomes significant, during subsequent in-mold molding, fusion between particles tends to worsen, resulting in a deterioration in the impact resistance, and shrinkage tends to cause a deterioration in the final external appearance of the foamed molded product, which is also undesirable. In addition, during production of the pre-foamed particle, the time required for impregnation of the polyolefin type resin particle with the styrene type monomer and subsequent polymerization of the styrene type monomer lengthens considerably, resulting in an undesirable deterioration in the production efficiency.

The ATR (Attenuated Total Reflectance) infrared spectroscopic analysis used in the present invention refers to an analysis method in which an infrared absorption spectrum is measured by a single reflection ATR method using the attenuated total reflectance. In this analysis method, an ATR prism having a high refractive index is positioned in close contact with the sample, the sample is irradiated with infrared light through the ATR prism, and the reflected light from the ATR prism is subjected to spectroscopic analysis.

For reasons including the fact that spectral measurement can be conducted simply by positioning the sample in close contact with the ATR prism, and the fact that surface analysis can be conducted down to a depth of several μm, ATR infrared spectroscopic analysis is widely used for the surface analysis of not only organic materials such as polymer materials, but also all manner of other materials.

The absorbance $D_{698}$ at 698 cm$^{-1}$ obtained from the infrared absorption spectrum refers to the height of the peak that appears in the vicinity of 698 cm$^{-1}$ and is attributable to an out-of-plane deformation vibration of the benzene ring contained mainly within the polystyrene type resin.

Further, the absorbance $D_{1376}$ at 1376 cm$^{-1}$ obtained from the infrared absorption spectrum refers to the height of the peak that appears in the vicinity of 1376 cm$^{-1}$ and is attributable to an asymmetric deformation vibration of CH$_3$ groups of —C—CH$_3$ hydrocarbon units contained within the polypropylene type resin.

In a method of determining the compositional ratio between the polystyrene type resin and the polypropylene type resin based on the absorbance ratio, a plurality of different standard samples are first prepared by uniformly mixing the polystyrene type resin and the polypropylene type resin in a series of predetermined compositional ratios, and then producing an infrared absorption spectrum for each sample by using ATR infrared spectroscopic analysis to conduct a particle surface analysis. The absorbance ratio is then measured for each of the obtained infrared absorption spectra. Subsequently, a calibration curve is drawn by plotting the compositional ratio (namely, the ratio (% by weight) of the polystyrene type resin within the standard sample) along the vertical axis, and the absorbance ratio ($D_{698}/D_{1376}$) across the horizontal axis. Based on this calibration curve, the absorbance ratio of a carbon-containing modified polystyrene type resin particle of the present invention can be used to determine the compositional ratio of the polystyrene type resin and the polypropylene type resin within the carbon-containing modified polystyrene type resin particle of the present invention.

For example, in the case where the polypropylene type resin is the product PC540R manufactured by SunAllomer Ltd., and the polystyrene type resin is a polystyrene (product name: SS142, manufactured by Sekisui Plastics Co., Ltd.), the compositional ratio can be ascertained by using the calibration curve illustrated in FIG. 1. For example, an absorbance ratio ($D_{698}/D_{1376}$) of 10.0 can be ascertained as representing a polypropylene type resin proportion of 20.2% by weight and a polystyrene type resin proportion of 79.8% by weight, whereas an absorbance ratio of 15.0 can be ascertained as representing a polypropylene type resin proportion of 8.1% by weight and a polystyrene type resin proportion of 90.9% by weight.

The conditions for preparing the calibration curve are outlined below.

The abovementioned standard samples are prepared using the following method.

First, the polystyrene type resin and the polypropylene type resin are weighed accurately to prepare combined sample weights of 2 g having the compositional ratios (polystyrene type resin/polypropylene type resin) shown below. Each of these samples is then subjected to heated kneading in a small injection molding device under the conditions described below, and a standard sample is then prepared by molding a circular disc of diameter 25 mm and height 2 mm.

As the small injection molding device, a device such as the product CS-183 marketed by CSI, Inc. may be used.

Injection molding conditions: heating temperature: 200 to 250° C., kneading time: 10 minutes.

Compositional ratio (polystyrene type resin/polypropylene type resin, weight ratio): 0/10, 1/9, 2/8, 3/7, 4/6, 5/5, 6/4, 7/3, 8/2, 9/1, 10/0.

The absorbance ratio of each of the above standard samples is measured, and the calibration curve of FIG. 1 is then prepared by graphing the polystyrene type resin ratio (% by weight) against the absorbance ratio ($D_{698}/D_{1376}$).

In FIG. 1, when the polystyrene type resin proportion is 40% or less, the calibration curve can be approximated by formula (1) shown below.

$$Y = -2.5119X^2 + 22.966X \tag{1}$$

Further, in FIG. 1, when the polystyrene type resin proportion is 40% by weight or greater, the calibration curve can be approximated by formula (2) shown below.

$$Y = 27.591 \ln(X) + 16.225 \tag{2}$$

The carbon-containing modified polystyrene type resin particle according to the present invention can be produced efficiently and with a favorable yield by a method of producing a carbon-containing modified polystyrene type resin particle according to the present invention that includes steps (A) to (D) described below:

(A) dispersing 100 parts by weight of a carbon-containing polypropylene type resin particle, not less than 100 parts by weight but less than 400 parts by weight of a styrene type monomer, and a polymerization initiator within an aqueous suspension containing a dispersant, (B) heating the resulting dispersion to a temperature at which the styrene type monomer undergoes substantially no polymerization, thereby impregnating the carbon-containing polypropylene type resin particle with the styrene type monomer, (C) performing a first polymerization of the styrene type monomer at a temperature within a range from (T−10)° C. to (T+20)° C., wherein T° C. represents the melting point of the carbon-containing polypropylene type resin particle, and (D) following the first polymerization, adding a styrene type monomer and a polymerization initiator, and then heating to a temperature within a range from (T−25)° C. to (T+10)° C., wherein T° C. represents the melting point of the carbon-containing polypropylene type resin particle, thereby impregnating the carbon-containing polypropylene type resin particle with the styrene type monomer and performing a second polymerization.

Furthermore, in addition to steps (A) to (D) outlined above, the method of producing a carbon-containing modified polystyrene type resin particle according to the present invention may further include a step (E) described below.

(E) Impregnating the resin particle with a flame retardant and/or a flame retardant assistant, either during the second polymerization or after completion of the second polymerization.

By including step (E), a foamable carbon-containing modified polystyrene type resin particle can be obtained that is ideal for producing a foamed molded product having self-extinguishing properties.

Each of the above steps (A) to (E) can be executed using an autoclave polymerization apparatus or the like that is used for executing conventional polystyrene type resin suspension polymerization methods or seed polymerization methods, in which beads of a polystyrene type resin particle are produced using a styrene type monomer as the raw material, although the production apparatus used is not restricted to this type of apparatus.

In step (A), the carbon-containing polypropylene type resin particle is obtained, for example, by melting the carbon-containing polypropylene type resin in an extruder and then conducting pelletization using a strand cut, under-water cut or hot cut technique, or by crushing the resin particles within a crusher and conducting pelletization directly. The shape of the resin particle may be spherical, elliptical (egg-shaped), circular cylindrical, or prismatic cylindrical or the like. A preferred resin particle diameter for the polypropylene type resin particle is within a range from 0.5 to 1.5 mm, and a particle diameter within a range from 0.6 to 1.0 mm is more desirable.

Further, in the aforementioned step (A), the carbon-containing polypropylene type resin preferably has a melting point within a range from 120 to 145° C.

Examples of the dispersant used in step (A) include organic dispersants such as partially saponified polyvinyl alcohol, polyacrylates, polyvinylpyrrolidone, carboxymethylcellulose and methylcellulose, and inorganic dispersants such as magnesium pyrophosphate, calcium pyrophosphate, calcium phosphate, calcium carbonate, magnesium phosphate, magnesium carbonate, and magnesium oxide. Of these, inorganic dispersants are preferred. If an inorganic dispersant is used, a surfactant is preferably used in combination with the dispersant. Examples of this surfactant include sodium dodecylbenzenesulfonate and sodium α-olefinsulfonates.

Furthermore, as the polymerization initiator, conventional polymerization initiators typically used in styrene type monomer polymerizations can be used. Examples include organic peroxides such as benzoyl peroxide, lauroyl peroxide, t-amyl peroxyoctoate, t-butyl peroxybenzoate, t-amyl peroxybenzoate, t-butyl peroxypivalate, t-butyl peroxyisopropylcarbonate, t-butyl peroxyacetate, t-butyl peroxy-3,3,5-trimethylcyclohexanoate, di-t-butyl peroxyhexahydroterephthalate, 2,2-di-t-butyl peroxybutane and dicumyl peroxide, and azo compounds such as azobisisobutyronitrile and azobisdimethylvaleronitrile. These polymerization initiators may be used either individually or in combination.

Further, if a cross-linking agent is added, then examples of the addition method include methods in which the cross-linking agent is added directly to the carbon-containing polypropylene type resin, methods in which the cross-linking agent is dissolved in a solvent, plasticizer or styrene type monomer prior to addition, and methods in which the cross-linking agent is dispersed in water prior to addition. Of these, methods in which the cross-linking agent is dissolved in the styrene type monomer prior to addition are preferred.

In order to ensure effective impregnation of the carbon-containing polypropylene type resin particle, the styrene type monomer may be added continuously or intermittently to an aqueous medium. The styrene type monomer is preferably added gradually to the aqueous medium. Examples of the aqueous medium include water, and mixed media containing water and a water-soluble solvent (such as an alcohol).

In step (B), the temperature during heating of the dispersion obtained in step (A) to a temperature at which the styrene type monomer undergoes no substantial polymerization, thereby impregnating the styrene type monomer within the carbon-containing polypropylene type resin particle, is typically within a range from 45 to 70° C., and is preferably from 50 to 65° C.

If this impregnation temperature is less than the above range, then the impregnation of the styrene type monomer tends to be unsatisfactory, and a polymerization powder of polystyrene is generated, which is undesirable. In contrast, if the impregnation temperature exceeds the above range, then polymerization tends to occur prior to satisfactory impregnation of the styrene type monomer into the carbon-containing polypropylene type resin particle, which is also undesirable.

In step (C) and step (D), the polymerization temperature is an important factor, and if the melting point of the carbon-containing polypropylene type resin particle is deemed T° C., then in step (C) (the first polymerization), the polymerization temperature is set within a range from (T−10) to (T+20)° C., whereas in step (D) (the second polymerization), the polymerization temperature is set within a range from (T−25) to (T+10)° C.

By performing the polymerization(s) within the above temperature range(s), a product is obtained in which the central part of the resin particle contains a large amount of the polystyrene type resin (in other words, the surface layer contains a large amount of the carbon-containing polypropylene type resin), and as a result, the respective advantages of a polypropylene type resin and a polystyrene type resin can both be realized, meaning a carbon-containing modified polystyrene type resin particle can be provided that exhibits excellent levels of rigidity, foam moldability, chemical resistance, impact resistance and blackness.

If the polymerization temperature is lower than the above temperature range, then the amount of the polystyrene type resin within the central part of the resin particle decreases, and a resin particle or foamed molded product that exhibits excellent physical properties is unobtainable. Further, if the polymerization temperature is higher than the above temperature range, then the polymerization is initiated before the styrene type monomer has been adequately impregnated within the carbon-containing polypropylene type resin particle, meaning a resin particle or foamed molded product that exhibits excellent physical properties is unobtainable. Furthermore, expensive polymerization equipment with a high degree of heat resistance is also required.

Furthermore, the reason for splitting the polymerization of the styrene type monomer impregnated within the carbon-containing polypropylene type resin particle into two steps, namely step (C) (the first polymerization) and step (D) (the second polymerization), is that if an attempt is made to impregnate the carbon-containing polypropylene type resin with a large amount of the styrene type monomer in a single step, then the impregnation of the styrene type monomer within the carbon-containing polypropylene type resin tends to be unsatisfactory, and much of the styrene type monomer remains at the surface of the carbon-containing polypropylene type resin. Accordingly, by splitting the polymerization into two steps, namely step (C) and step (D), as in the method of producing a modified polystyrene type resin particle according to the present invention, the styrene type monomer is able to penetrate reliably into the central part of the carbon-containing polypropylene type resin during step (C), and similarly in step (D), the styrene type monomer penetrates towards the central part of the carbon-containing polypropylene type resin.

In step (E), the temperature settings during impregnation of the resin particle with the flame retardant and/or flame retardant assistant, either during the second polymerization or after completion of the second polymerization, are such that the temperature during introduction of the flame retardant and/or flame retardant assistant is typically within a range from 30 to 90° C., and preferably from 50 to 70° C., whereas the temperature after completion of the introduction of the flame retardant and/or flame retardant assistant is preferably set within a range from t° C. to (t+30)° C., wherein 1° C. represents the higher of the two melting points for the flame retardant and the flame retardant assistant. If this temperature is less than t° C., then the flame retardant and/or flame retardant assistant may not be impregnated satisfactorily within the modified polystyrene type resin particle, whereas if the temperature is greater than (t+30)° C., then expensive polymerization equipment with a high degree of heat resistance tends to be required.

Following completion of the polymerization of step (D), the reaction tank is cooled, and the formed carbon-containing modified polystyrene type resin particles are separated from the aqueous medium, yielding carbon-containing modified polystyrene type resin particles containing not less than 100 parts by weight but less than 400 parts by weight of the polystyrene type resin per 100 parts by weight of the carbon-containing polypropylene type resin, in which the polystyrene type resin ratio at the central part of the particle is at least 1.2 times the polystyrene type resin ratio of the overall particle, the polystyrene type resin ratio being calculated by using the ratio ($D_{698}/D_{1376}$) of absorbances at 698 $cm^{-1}$ and 1376 $cm^{-1}$ obtained from the infrared absorption spectrum measured by ATR infrared spectroscopic analysis.

Further, following completion of step (E), the reaction tank is cooled, and the formed carbon-containing modified polystyrene type resin particles are separated from the aqueous medium, yielding carbon-containing modified polystyrene type resin particles which, in addition to the properties described above, contain not less than 1.5 parts by weight but less than 6 parts by weight of a flame retardant, and/or not less than 0.1 parts by weight but less than 3 parts by weight of a flame retardant assistant, per 100 parts by weight of the carbon-containing polystyrene type resin particles.

In the method of producing a carbon-containing modified polystyrene type resin particle according to the present invention, a carbon-containing polypropylene type resin particle, a styrene type monomer and a polymerization initiator are dispersed within an aqueous suspension containing a dispersant, and following impregnation of the carbon-containing polypropylene type resin particle with the styrene type monomer, a first stage polymerization is conducted at a temperature within a range from (T−10)° C. to (T+20)° C., and a second stage polymerization is then conducted at a temperature within a range from (T−25)° C. to (T+10)° C., wherein T° C. represents the melting point of the polypropylene type resin particle. Accordingly, a carbon-containing modified polystyrene type resin particle can be produced for which the polystyrene type resin ratio within the central part of the particle is at least 1.2 times the polystyrene type resin ratio of the overall particle, the polystyrene type resin ratio being calculated by using the ratio ($D_{698}/D_{1376}$) of absorbances at 698 $cm^{-1}$ and 1376 $cm^{-1}$ obtained from the infrared absorption spectrum measured by ATR infrared spectroscopic analysis.

Furthermore, in those cases where the method of producing a carbon-containing modified polystyrene type resin particle according to the present invention includes a step of impregnating the resin particle with a flame retardant and/or a flame retardant assistant, either during the second polymerization or after completion of the second polymerization, a carbon-containing modified polystyrene type resin particle can be produced which, in addition to the properties described above, contains not less than 1.5 parts by weight but less than 6 parts by weight of a flame retardant, and/or not less than 0.1 parts by weight but less than 3 parts by weight of a flame retardant assistant, per 100 parts by weight of the carbon-containing polystyrene type resin particle.

In those cases where the obtained carbon-containing modified polystyrene type resin particle is impregnated with a foaming agent to form a foamable resin particle, and this foamable resin particle is then packed inside a molding die and subjected to in-mold foam molding, a foamed molded product can be obtained that combines the advantages of a polypropylene type resin and a polystyrene type resin, and exhibits excellent levels of rigidity, foam moldability, chemical resistance, heat resistance and blackness. Furthermore, in those cases where the obtained carbon-containing modified polystyrene type resin particle contains a flame retardant and/or a flame retardant assistant, a foamable carbon-containing modified polystyrene type resin particle can be obtained that is ideal for producing a foamed molded product that not only retains the favorable properties listed above, but also exhibits self-extinguishing properties. Accordingly, the production method of the present invention is able to provide a carbon-containing modified polystyrene type resin particle that is ideal for producing a foamed molded product having the abovementioned superior physical properties.

The present invention provides a foamable carbon-containing modified polystyrene type resin particle, which is obtained by impregnating the abovementioned carbon-containing modified polystyrene type resin particle with a foaming agent, and preferably a high-volatility foaming agent, as well as a method of producing such a foamable resin particle.

Examples of the high-volatility foaming agent impregnated within the carbon-containing modified polystyrene type resin particle include readily volatile compounds having a boiling point that is no higher than the softening temperature of the polymer, and specific examples include propane, n-butane, i-butane, n-pentane, i-pentane, cyclopentane, carbon dioxide gas and nitrogen, and these foaming agents may be used either individually, or in combinations of two or more different foaming agents. The amount used of the high-volatility foaming agent is preferably within a range from 5 to 25 parts by weight per 100 parts by weight of the carbon-containing modified polystyrene type resin particle.

Moreover, a foaming assistant may also be used in combination with the foaming agent. Examples of this type of foaming assistant include solvents such as toluene, xylene, ethylbenzene, cyclohexane and D-limonene, and plasticizers (high-boiling point solvents) such as diisobutyl adipate, diacetylated monolaurate and coconut oil. The amount added of the foaming assistant is preferably within a range from 0.1 to 2.5 parts by weight per 100 parts by weight of the carbon-containing modified polystyrene type resin particle.

Furthermore, surface treatment agents such as binding inhibitors, fusion promoters, antistatic agents and spreading agents may also be added to the foamable carbon-containing modified polystyrene type resin particle.

A binding inhibitor performs the role of preventing cohesion between pre-foamed particles during pre-foaming of the foamable carbon-containing modified polystyrene type resin particles. Here, the term "cohesion" refers to the process in which a plurality of pre-foamed particles bind together to form a single integrated particle. Specific examples of the binding inhibitor include talc, calcium carbonate, zinc stearate, aluminum hydroxide, ethylene bis-stearyl amide, calcium triphosphate, and dimethylpolysiloxane.

A fusion promoter performs the role of promoting fusion of pre-foamed particles during secondary foam molding of the pre-foamed particles. Specific examples include stearic acid, stearic triglyceride, hydroxystearic triglyceride, and sorbitan stearate.

Examples of antistatic agents include polyoxyethylene alkylphenol ethers and stearyl monoglyceride. Examples of spreading agents include polybutene, polyethylene glycol and silicone oil. The combined amount of the above surface treatment agents is preferably within a range from 0.01 to 2.0 parts by weight per 100 parts by weight of the modified polystyrene type resin particle.

The method used for impregnating the carbon-containing modified polystyrene type resin particle with the foaming agent may be selected in accordance with the variety of foaming agent used. Examples include methods in which the foaming agent is injected into an aqueous medium containing the carbon-containing modified polystyrene type resin particle dispersed therein, thereby impregnating the foaming agent within the resin, and methods in which the carbon-containing modified polystyrene type resin particle is supplied to a rotational mixer, and the foaming agent is also injected into the rotational mixer, thereby impregnating the foaming agent within the resin particle. The temperature during impregnation of the foaming agent into the carbon-containing modified polystyrene type resin particle is preferably within a range from 50 to 140° C.

A foamable carbon-containing modified polystyrene type resin particle of the present invention is prepared by impregnating the above carbon-containing modified polystyrene type resin particle with a foaming agent, and therefore a foamable carbon-containing modified polystyrene type resin particle can be provided that is ideal for producing a foamed molded product that exhibits excellent levels of rigidity, foam moldability, chemical resistance and blackness. Furthermore, in those cases where the carbon-containing modified polystyrene type resin particle contains a flame retardant and/or flame retardant assistant, a foamable carbon-containing modified polystyrene type resin particle can be provided that is ideal for producing a foamed molded product that not only retains the favorable properties listed above, but also exhibits self-extinguishing properties.

The present invention also provides a carbon-containing modified polystyrene type resin foamed particle (hereafter also referred to as a "pre-foamed particle") obtained by heating and pre-foaming the above foamable carbon-containing modified polystyrene type resin particle, as well as a method of producing the pre-foamed particle.

The heating conditions and apparatus used for the pre-foaming may be the same as those used in the production of conventional polystyrene type resin pre-foamed particles. For example, the pre-foamed particle can be obtained by heating the foamable carbon-containing modified polystyrene type resin particle inside a pre-foaming apparatus under an atmosphere including a steam pressure of 0.5 to 4.0 kg/cm²G (approximately 0.05 to 0.4 MPa). The heating time is typically within a range from approximately 20 to 120 seconds.

The pre-foamed particle typically has a bulk density of 0.0166 to 0.20 g/cm³. A preferred bulk density is within a range from 0.02 to 0.1 g/cm³. A more preferred bulk density is within a range from 0.025 to 0.05 g/cm³. If the bulk density is less than 0.0166 g/cm³, then the strength of the foamed molded product obtained by foaming the pre-foamed particles tends to deteriorate, which is undesirable. On the other hand, if the bulk density exceeds 0.2 g/cm³, then the weight of the foamed molded product obtained by foaming the pre-foamed particles increases, which is also undesirable.

Furthermore, if this bulk density is represented in terms of the bulk foam expansion ratio, then because the bulk foam expansion ratio=1/bulk density (g/cm³), the pre-foamed particle typically has a bulk foam expansion ratio within a range from 5 to 60 (fold), and this bulk foam expansion ratio is preferably within a range from 10 to 50 (fold), and more preferably from 20 to 40 (fold).

There are no particular restrictions on the shape of the pre-foamed particle, provided the shape has no adverse effects on the subsequent in-mold foam molding. Suitable shapes include spherical, elliptical (egg-shaped), circular cylindrical and prismatic cylindrical shapes. Of these, spherical and elliptical particles, which enable ready packing of the cavity inside the molding die, are particularly preferred.

This pre-foamed particle may include additives. Examples of these additives include foaming nuclei such as talc, calcium silicate, ethylene bis-stearyl amide and methacrylate ester-based copolymers, fillers such as synthetic or naturally produced silicon dioxide and the like, flame retardants such as hexabromocyclododecane and triallyl isocyanurate hexabromide, plasticizers such as diisobutyl adipate, liquid paraffin, glycerol diacetomonolaurate and coconut oil, colorants such as carbon black and graphite, as well as ultraviolet absorbers and antioxidants.

The pre-foamed particle of the present invention is produced by pre-foaming the aforementioned foamable carbon-containing modified polystyrene type resin particle, and can therefore provide a pre-foamed particle that is ideal for producing a foamed molded product that exhibits excellent levels of rigidity, foam moldability, chemical resistance, heat resistance and blackness. Further, in those cases where the foamable carbon-containing modified polystyrene type resin particle also contains a flame retardant and/or flame retardant assistant, a pre-foamed particle can be provided that is ideal for producing a foamed molded product that not only retains the favorable properties listed above, but also exhibits self-extinguishing properties.

The present invention provides a carbon-containing modified polystyrene type resin foamed molded product (hereafter also referred to as "the foamed molded product") obtained by subjecting the abovementioned pre-foamed particle to in-mold foam molding, as well as a method of producing the foamed molded product.

In order to convert the above pre-foamed particle into a foamed molded product, the pre-foamed particle is usually aged by standing for approximately 24 hours, and is subsequently packed inside the cavity of a molding die, and then heated to effect in-mold foam molding, thereby causing the pre-foamed particles to fuse together to form an integrated foamed molded product having the desired shape. This in-mold foam molding can be conducted, for example, by introducing steam with a vapor pressure of 0.5 to 4.5 kg/cm²G (approximately 0.05 to 0.45 MPa) into the interior of the molding die.

The foamed molded product of the present invention has a density that is typically within a range from 0.0166 to 0.2 g/cm³, preferably within a range from 0.02 to 0.1 g/cm³, and more preferably from 0.025 to 0.05 g/cm³.

If the density of the foamed molded product is less than 0.0166 g/cm³, then the strength of the foamed molded product obtained by foaming the pre-foamed particles tends to deteriorate, which is undesirable. On the other hand, if the density of the foamed molded product exceeds 0.2 g/cm³, then the weight of the foamed molded product obtained by foaming the pre-foamed particles increases, which is also undesirable. Further, if this density is represented in terms of the foam expansion ratio, then because the foam expansion ratio=1/density (g/cm³), the foamed molded product typically has a foam expansion ratio within a range from 5 to 60 (fold), and this foam expansion ratio is preferably within a range from 10 to 50 (fold), and more preferably from 20 to 40 (fold).

Further, for the foamed molded product of the present invention, the shrinkage factor for the foamed molded product in a dimensional change measurement conducted in accordance with JIS K 6767 under conditions at 80° C. is preferably 1.0% or less. If this shrinkage factor exceeds 1.0%, then the molded product suffers from poor dimensional stability, which is undesirable.

Smaller shrinkage factors are more desirable, and therefore there is no need to specify a lower limit for the shrinkage factor. Accordingly, the lower limit for the shrinkage factor is preferably zero.

Furthermore, for the foamed molded product of the present invention, a combustion rate measured in accordance with FMVSS 302 of 0 mm/min indicates favorable self-extinguishing properties, and is therefore preferred.

The foamed molded product of the present invention is obtained by conducting in-mold foam molding of the carbon-containing modified polystyrene type resin particle described above, and can therefore provide a foamed molded product that exhibits excellent levels of rigidity, foam moldability, chemical resistance, heat resistance and blackness. Furthermore, in those cases where the carbon-containing modified polystyrene type resin particle also contains a flame retardant and/or flame retardant assistant, a carbon-containing modified polystyrene type resin foamed molded product can be provided that not only retains the favorable properties listed above, but also exhibits self-extinguishing properties.

The foamed molded product obtained in the above manner can be used in all manner of applications, including as the core material for vehicle bumpers, vehicle cushioning materials such as the cushioning materials within door panels, and as transport containers for electronic components, all manner of industrial materials and foodstuffs and the like.

EXAMPLES

The present invention is described in more detail below based on a series of examples, although the present invention is in no way limited by these examples. In the following examples, the methods used for measuring the melting point, bulk density, dimensional change upon heating, chemical resistance, degree of blackness, and absorbance ratio are described below.

<Melting Point>

The melting point was measured using the method described in JIS K 7122:1987 "Testing Methods for Heat of Transition of Plastics". Namely, using a differential scanning calorimeter apparatus DSC220 (manufactured by Seiko Instruments Inc.), 7 mg of the sample was packed in a measurement container, and under a nitrogen gas flow rate of 30 ml/min., the temperature was increased, decreased, and then increased again across a temperature range from room temperature to 220° C. at a rate of temperature change of 10° C./min., and the melting peak temperature on the DSC curve during the second temperature increase was recorded as the melting point. Further, in the case of two or more melting peaks, the temperature of the lower temperature peak was recorded as the melting point.

<Bulk Density>

The bulk density of the pre-foamed particle was measured under the following conditions.

First, 500 cm³ of the pre-foamed particles were used to fill a measuring cylinder up to the 500 cm³ graduation. Viewing the measuring cylinder from horizontally, the point where even a single pre-foamed particle reached the 500 cm³ graduation was deemed to indicate the end point of the filling of the measuring cylinder with the pre-foamed particles.

Subsequently, the weight of the pre-foamed particles packed inside the measuring cylinder was measured to two decimal places, and that value was recorded as the weight W (g).

The bulk density of the pre-foamed particle was then calculated using the following formula.

Bulk density (g/cm³)=W/500

<Bulk Foam Expansion Ratio>

The bulk foam expansion ratio of the pre-foamed particle was calculated using the following formula.

Bulk foam expansion ratio=1/density (g/cm³)

<Density>

The density of the foamed molded product was measured under the following conditions.

Measurement was conducted using the method described in JIS K 7122:1999 "Cellular plastics and rubbers–Determination of apparent density".

A test piece of at least 50 cm³ (or at least 100 cm³ in the case of a semi-hard or soft material) was cut in such a manner so as not to alter the original cell structure of the material, the weight of the test piece was measured, and the density was then calculated using the following formula.

Density (g/cm³)=test piece weight (g)/test piece volume (cm³)

In terms of regulating the state of the test piece, the test piece for measurement was cut from a sample that had been left to stand for at least 72 hours after molding, and was subsequently left to stand for at least 16 hours in an atmosphere of (23° C.±2° C.)×(50%±5%) or (27° C.±2° C.)×(65° A, ±5%).

<Foam Expansion Ratio>

The foam expansion ratio of the foamed molded product was calculated using the following formula.

Foam expansion ratio=1/density (g/cm³)

<Dimensional Change Upon Heating>

The dimensional change upon heating was measured in accordance with the B method described in JIS K 6767:1999K "Testing Methods for Foam Plastics and Polyethylene".

Using a test piece having dimensions of 150×150×original thickness (mm), three parallel straight lines with a spacing therebetween of 50 mm were inserted along both the lengthwise and the widthwise directions within the central region of the test piece, the test piece was then placed in a circulating hot-air dryer at 80° C. for 22 hours, was subsequently removed and left to stand under normal conditions for one hour, and the dimensions of the lengthwise and widthwise lines were then measured and inserted into the following formula:

$$S=(L_1-L_0)/L_0\times100$$

wherein S represents the dimensional change upon heating (%), $L_1$ represents the average dimension (mm) following heating, and $L_0$ represents the initial average dimension (mm).

The dimensional change upon heating S was evaluated against the following criteria.

◯: 0≤S<1; dimensional change was low, and dimensional stability was favorable.

Δ: 1≤S<5; dimensional change was evident, but still practically applicable.

x: S≥5; dimensional change was marked, and the product was not practically applicable.

<Chemical Resistance>

A sheet-shaped test piece having a planar rectangular shape of dimensions of length: 100 mm×width: 100 mm×thickness: 20 mm was cut from the foamed molded product, and then left to stand for 24 hours under conditions including a temperature of 23° C. and a humidity of 50%. The test piece was cut from the foamed molded product so that the entire upper surface of the test piece was formed from the surface of the foamed molded product. Subsequently, 1 g of gasoline was applied uniformly to the test piece as a chemical, and was then left to stand for 60 minutes under conditions including a temperature of 23° C. and a humidity of 50%. Subsequently, the chemical was wiped off the upper surface of the test piece, and the upper surface of the test piece was inspected visually and evaluated against the following criteria.

◯: Good, no change

Δ: Somewhat poor, softening of the surface x: Poor, surface collapse (shrinkage)

<Degree of Blackness>

Evaluation of the coloring was conducted by using a colorimeter (product name: ND-1001DP (integrating sphere system), manufactured by Nippon Denshoku Industries Co., Ltd.) to measure the L value at the surface of the molded product in accordance with the reflection method prescribed in JIS K7105 "Testing Methods for Optical Properties of Plastics".

The measurement mode was set to Lab, and the L value was measured. The measurement surface area was set to 30 mmφ.

The measured result for the L value was used to evaluated the degree of blackness against the following criteria.

◯: The L value was at least 0 but not more than 20.

Δ: The L value was greater than 20 but not more than 25.

x: The L value was greater than 25 but not more than 100.

Further, the surface of the molded product was also inspected visually, and the level of color irregularity was evaluated against the following criteria.

◯: The coloring of the molded product was uniform overall.

Δ: Coloring non-uniformity was observed on portions of the molded product.

x: The coloring of the molded product was non-uniform overall.

<Combustion Rate>

The combustion rate was measured in accordance with FMVSS 302 of the Federal Motor Vehicle Safety Standards (US). A test piece was prepared with a bulk foam expansion ratio of 30-fold and dimensions of 350 mm×100 mm×12 mm (thickness), wherein at least the two 350 mm×100 mm surfaces had a surface coating. The combustion rate was evaluated against the following criteria.

◯: In the foamed molded product having a bulk foam expansion ratio of 30-fold, the flame was extinguished before reaching the measurement start point. In this case, the combustion rate was recorded as 0 mm/min.

x: In the foamed molded product having a bulk foam expansion ratio of 30-fold, the combustion rate was larger than 0 mm/min.

<Absorbance Ratio and Polystyrene Type Resin Ratio in Central Part of Resin Particle and Within Surface Layer>

The absorbance ratio ($D_{698}/D_{1376}$) was measured in the manner described below. Namely, 10 pre-foamed particles were selected at random, and the central part and surface of each particle were subjected to ATR infrared spectroscopic analysis to produce infrared absorption spectra. In the measurement of the central part of the particle, each particle was cut in half (for example, a pre-foamed particle having a particle diameter of 5 mm was cut into two portions of 2.5±0.5 mm), and measurement was conducted with the ATR prism brought into contact with the center of the cross-sectional surface of the cut portion (or at least a position within ¼ of the center of the circular cross-section). Further, in the measurement of the particle surface, measurement was conducted with the ATR prism in close contact with the surface of each pre-foamed particle. The absorbance ratio ($D_{698}/D_{1376}$) was calculated from each of the infrared absorption spectra, and the minimum absorbance ratio and the maximum absorbance ratio were discarded. The arithmetic average of the absorbance ratios for the remaining 8 particles was reported as the absorbance ratio ($D_{698}/D_{1370}$). The absorbance ratio ($D_{698}/D_{1376}$) was measured, for example, using a measurement apparatus marketed under the product name "Fourier transform infrared spectrometer MAGMA560" by Nicolet Corporation (current name: Thermo Fisher Scientific, Inc.).

The polystyrene type resin ratio (% by weight) was determined from the absorbance ratio ($D_{698}/D_{1376}$) based on the calibration curve described above.

<Absorbance Ratio and Polystyrene Type Resin Ratio of Overall Particle>

The absorbance ratio ($D_{698}/D_{1376}$) was measured in the manner described below.

Namely, a sample of the pre-foamed particles was heated and subjected to volume reduction at a heating temperature of 200 to 250° C., was subsequently cooled and then crushed, and 2 g of the crushed powder was then weighed. This crushed powder sample was subjected to heated kneading in a small injection molding device under the conditions described below, and a measurement sample was then prepared by molding a circular disc of diameter 25 mm and height 2 mm. As the small injection molding device, the product CS-183 marketed by CSI, Inc. was used.

Injection molding conditions: heating temperature: 200 to 250° C., kneading time: 10 minutes.

The surface of the measurement sample was subjected to ATR infrared spectroscopic analysis to produce an infrared absorption spectrum. The absorbance ratio ($D_{698}/D_{1376}$) was calculated from each infrared absorption spectrum. The absorbance ratio ($D_{698}/D_{1376}$) was measured, for example, using a measurement apparatus marketed under the product name "Fourier transform infrared spectrometer MAGMA560" by Nicolet Corporation (current name: Thermo Fisher Scientific, Inc.).

The polystyrene type resin ratio (% by weight) was determined from the absorbance ratio ($D_{698}/D_{1376}$) based on the calibration curve described above.

Example 1

1,880 g of a polypropylene type resin (product name: F-744NP, manufactured by Prime Polymer Co., Ltd., melting point: 140° C.) and 120 g of a furnace black (product name: #900, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 800 g of these carbon-containing polypropylene type resin particles were placed in a 5 L autoclave fitted with a stirrer, 2 kg of pure water as an aqueous medium, 20 g of magnesium pyrophosphate, and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 400 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 135° C., which is 5° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 120° C., which is 20° C. lower than the melting point of the carbon-containing polypropylene type resin particles, 1.5 g of sodium dodecylbenzenesulfonate was added to the suspension, and then 800 g of the styrene monomer containing 3.6 g of dicumyl peroxide dissolved therein as a polymerization initiator was added dropwise to the suspension over a period of 4 hours, thereby absorbing the styrene monomer into the carbon-containing polypropylene type resin particles while effecting a polymerization (the second polymerization).

Following completion of the dropwise addition, the temperature was held at 120° C. for one hour, and the temperature was then increased to 140° C. and held for a further 3 hours to complete the polymerization, thus yielding carbon-containing modified polystyrene type resin particles.

Subsequently, the resin particles were cooled to room temperature, and then removed from the 5 L autoclave. 2 kg of the removed carbon-containing modified polystyrene type resin particles and 2 L of water were returned to the 5 L autoclave fitted with a stirrer, and 300 g of butane as a foaming agent was injected into the 5 L autoclave fitted with a stirrer. Following this injection, the temperature was raised to 70° C., and stirring was continued for 4 hours. The system was then cooled to room temperature, and the suspension was removed from the 5 L autoclave, dewatered and dried, yielding foamable carbon-containing modified polystyrene type resin particles.

The thus obtained foamable carbon-containing modified polystyrene type resin particles were pre-foamed using a bulk foam expansion ratio of 30-fold, thus yielding carbon-containing modified polystyrene type resin foamed particles. Measurements of the absorbance were then conducted using these carbon-containing modified polystyrene type resin foamed particles, and the polystyrene type resin ratio was calculated.

The thus obtained carbon-containing modified polystyrene type resin foamed particles were allowed to stand for one day at room temperature, and were then packed inside the cavity of a molding die having a cavity of dimensions 400 mm×300 mm×50 mm, heating was subsequently conducted by injecting steam into the molding die at 0.20 MPa for 50 seconds, and the system was then cooled until the maximum surface pressure of the foamed molded product fell to 0.001 MPa, thereby completing formation of a foamed molded product. Under these molding conditions, a foamed molded product having favorable external appearance and fusion was obtained. Using the thus obtained carbon-containing modified polystyrene type resin foamed molded product, measurements were conducted of the foam expansion ratio, the dimensional change upon heating, the chemical resistance and the degree of blackness.

Example 2

1,880 g of a polypropylene type resin (product name: F-744NP, manufactured by Prime Polymer Co., Ltd., melting point: 140° C.) and 120 g of a furnace black (product name: #900, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 600 g of these carbon-containing polypropylene type resin particles were placed in a 5 L autoclave fitted with a stirrer, 2 kg of pure water as an aqueous medium, 20 g of magnesium pyrophosphate, and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 300 g of a styrene monomer with 0.6 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 135° C., which is 5° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 120° C., which is 20° C. lower than the melting point of the carbon-containing polypropylene type resin particles, 1.5 g of sodium dodecylbenzenesulfonate was added to the suspension, and then 1,100 g of the styrene monomer containing 4.2 g of dicumyl peroxide dissolved therein as a polymerization initiator was added dropwise to the suspension over a period of 5 hours and 30 minutes, thereby absorbing the styrene monomer into the carbon-containing polypropylene type resin particles while effecting a polymerization (the second polymerization).

Following completion of the dropwise addition, the temperature was held at 120° C. for one hour, and the temperature was then increased to 140° C. and held for a further 3 hours to complete the polymerization, thus yielding carbon-containing modified polystyrene type resin particles.

Subsequently, the resin particles were cooled to room temperature, and then removed from the 5 L autoclave. 2 kg of the removed carbon-containing modified polystyrene type resin particles and 2 L of water were returned to the 5 L autoclave fitted with a stirrer, and 300 g of butane as a foaming agent was injected into the 5 L autoclave fitted with a stirrer. Following this injection, the temperature was raised to 70° C., and stirring was continued for 4 hours. The system was then cooled to room temperature, and the suspension was removed from the 5 L autoclave, dewatered and dried, yielding foamable carbon-containing modified polystyrene type resin particles.

The thus obtained foamable carbon-containing modified polystyrene type resin particles were pre-foamed using a bulk foam expansion ratio of 30-fold, thus yielding carbon-containing modified polystyrene type resin foamed particles. Measurements of the absorbance were then conducted using these carbon-containing modified polystyrene type resin foamed particles, and the polystyrene type resin ratio was calculated.

A carbon-containing modified polystyrene type resin foamed molded product was then obtained in the same manner as example 1. Using the thus obtained carbon-containing modified polystyrene type resin foamed molded product, measurements were conducted of the foam expansion ratio, the dimensional change upon heating, the chemical resistance and the degree of blackness.

Example 3

1,880 g of a polypropylene type resin (product name: F-744NP, manufactured by Prime Polymer Co., Ltd., melting point: 140° C.) and 120 g of a furnace black (product name: #900, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 1,000 g of these carbon-containing polypropylene type resin particles were placed in a 5 L autoclave fitted with a stirrer, 2 kg of pure water as an aqueous medium, 20 g of magnesium pyrophosphate, and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 500 g of a styrene monomer with 1.0 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 135° C., which is 5° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 120° C., which is 20° C. lower than the melting point of the carbon-containing polypropylene type resin particles, 1.5 g of sodium dodecylbenzenesulfonate was added to the suspension, and then 500 g of the styrene monomer containing 3 g of dicumyl peroxide dissolved therein as a polymerization initiator was added dropwise to the suspension over a period of 2 hours and 30 minutes, thereby absorbing the styrene monomer into the carbon-containing polypropylene type resin particles while effecting a polymerization (the second polymerization).

Following completion of the dropwise addition, the temperature was held at 120° C. for one hour, and the temperature was then increased to 140° C. and held for a further 3 hours to complete the polymerization, thus yielding carbon-containing modified polystyrene type resin particles.

Subsequently, the resin particles were cooled to room temperature, and then removed from the 5 L autoclave. 2 kg of the removed carbon-containing modified polystyrene type resin particles and 2 L of water were returned to the 5 L autoclave fitted with a stirrer, and 300 g of butane as a foaming agent was injected into the 5 L autoclave fitted with a stirrer. Following this injection, the temperature was raised to 70° C., and stirring was continued for 4 hours. The system was then cooled to room temperature, and the suspension was removed from the 5 L autoclave, dewatered and dried, yielding foamable carbon-containing modified polystyrene type resin particles.

The thus obtained foamable carbon-containing modified polystyrene type resin particles were pre-foamed using a bulk foam expansion ratio of 30-fold, thus yielding carbon-containing modified polystyrene type resin foamed particles. Measurements of the absorbance were then conducted using these carbon-containing modified polystyrene type resin foamed particles, and the polystyrene type resin ratio was calculated.

A carbon-containing modified polystyrene type resin foamed molded product was then obtained in the same manner as example 1. Using the thus obtained carbon-containing modified polystyrene type resin foamed molded product, measurements were conducted of the foam expansion ratio, the dimensional change upon heating, the chemical resistance and the degree of blackness.

Example 4

1,940 g of a polypropylene type resin (product name: F-744NP, manufactured by Prime Polymer Co., Ltd., melting point: 140° C.) and 60 g of a furnace black (product name: #900, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 3% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Thereafter, the same method as example 1 was used to prepare carbon-containing modified polystyrene type resin foamed particles, and using these carbon-containing modified polystyrene type resin foamed particles, the absorbance was measured and the polystyrene type resin ratio was calculated.

Subsequently, a carbon-containing modified polystyrene type resin foamed molded product was obtained in the same manner as example 1. Using the thus obtained carbon-containing modified polystyrene type resin foamed molded product, measurements were conducted of the foam expansion ratio, the dimensional change upon heating, the chemical resistance and the degree of blackness.

Example 5

1,840 g of a polypropylene type resin (product name: F-744NP, manufactured by Prime Polymer Co., Ltd., melting point: 140° C.) and 160 g of a furnace black (product name: #900, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 8% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Thereafter, the same method as example 1 was used to prepare carbon-containing modified polystyrene type resin foamed particles, and using these carbon-containing modified polystyrene type resin foamed particles, the absorbance was measured and the polystyrene type resin ratio was calculated.

Subsequently, a carbon-containing modified polystyrene type resin foamed molded product was obtained in the same manner as example 1. Using the thus obtained carbon-containing modified polystyrene type resin foamed molded product, measurements were conducted of the foam expansion ratio, the dimensional change upon heating, the chemical resistance and the degree of blackness.

Example 6

1,880 g of a polypropylene type resin (product name: F-744NP, manufactured by Prime Polymer Co., Ltd., melting point: 140° C.) and 120 g of a furnace black (product name: MA230, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Thereafter, the same method as example 1 was used to prepare carbon-containing modified polystyrene type resin foamed particles, and using these carbon-containing modified polystyrene type resin foamed particles, the absorbance was measured and the polystyrene type resin ratio was calculated.

Subsequently, a carbon-containing modified polystyrene type resin foamed molded product was obtained in the same manner as example 1. Using the thus obtained carbon-containing modified polystyrene type resin foamed molded product, measurements were conducted of the foam expansion ratio, the dimensional change upon heating, the chemical resistance and the degree of blackness.

Example 7

1,880 g of a polypropylene type resin (product name: PC540R, manufactured by SunAllomer Ltd., melting point: 132° C.) and 120 g of a furnace black (product name: #900, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 800 g of these carbon-containing polypropylene type resin particles were placed in a 5 L autoclave fitted with a stirrer, 2 kg of pure water as an aqueous medium, 20 g of magnesium pyrophosphate, and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 400 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 140° C., which is 8° C. higher than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 125° C., which is 7° C. lower than the melting point of the carbon-containing polypropylene type resin particles, 1.5 g of sodium dodecylbenzenesulfonate was added to the suspension, and then 800 g of the styrene monomer containing 3.6 g of dicumyl peroxide dissolved therein as a polymerization initiator was added dropwise to the suspension over a period of 4 hours, thereby absorbing the styrene monomer into the carbon-containing polypropylene type resin particles while effecting a polymerization (the second polymerization).

Following completion of the dropwise addition, with the exceptions of holding the temperature at 125° C. for one hour, and then increasing the temperature to 140° C. and holding this higher temperature for a further 3 hours to complete the polymerization and produce the carbon-containing modified polystyrene type resin particles, foamable carbon-containing modified polystyrene type resin particles were obtained in the same manner as example 1.

Carbon-containing modified polystyrene type resin foamed particles were then prepared in the same manner as example 1, and using these carbon-containing modified polystyrene type resin foamed particles, the absorbance was measured and the polystyrene type resin ratio was calculated.

A carbon-containing modified polystyrene type resin foamed molded product was then obtained in the same manner as example 1. Using the thus obtained carbon-containing modified polystyrene type resin foamed molded product, measurements were conducted of the foam expansion ratio, the dimensional change upon heating, the chemical resistance and the degree of blackness.

Example 8

1,880 g of a polypropylene type resin (product name: PC540R, manufactured by SunAllomer Ltd., melting point: 132° C.) and 120 g of a furnace black (product name: MA230, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 800 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 400 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 135° C., which is 3° C. higher than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 120° C., which is 12° C. lower than the melting point of the carbon-containing polypropylene type resin particles, 1.5 g of sodium dodecylbenzenesulfonate was added to the suspension, and then 800 g of the styrene monomer containing 3.6 g of dicumyl peroxide dissolved therein as a polymerization initiator was added dropwise to the suspension over a period of 4 hours, thereby absorbing the styrene monomer into the carbon-containing polypropylene type resin particles while effecting a polymerization (the second polymerization).

Following completion of the dropwise addition, the temperature was held at 120° C. for one hour, and the temperature was then increased to 140° C. and held for a further 3 hours to complete the polymerization, thus yielding carbon-containing modified polystyrene type resin particles. Subsequently, the temperature of the reaction system was reduced to 60° C., 40 g of tri(2,3-dibromopropyl) isocyanate (manufactured by Nippon Kasei Chemical Co., Ltd.) was added to the suspension, and following completion of the addition, the temperature of the reaction system was increased to 140° C., and the system was stirred at that temperature for 4 hours, thus forming carbon-containing modified polystyrene type resin particles.

Subsequently, the resin particles were cooled to room temperature, and then removed from the 5 L autoclave. 2 kg of the removed carbon-containing modified polystyrene type resin particles and 2 L of water were returned to the 5 L autoclave fitted with a stirrer, and 300 g of butane as a foaming agent was injected into the 5 L autoclave fitted with a stirrer. Following this injection, the temperature was raised to 70° C., and stirring was continued for 4 hours. The system was then cooled to room temperature, and the suspension was removed from the 5 L autoclave, dewatered and dried, yielding foamable carbon-containing modified polystyrene type resin particles.

The thus obtained foamable carbon-containing modified polystyrene type resin particles were pre-foamed using a bulk foam expansion ratio of 30-fold, thus yielding carbon-containing modified polystyrene type resin foamed particles. Measurements of the absorbance were then conducted using these carbon-containing modified polystyrene type resin foamed particles, and the polystyrene type resin ratio was calculated.

The thus obtained carbon-containing modified polystyrene type resin foamed particles were allowed to stand for one day at room temperature, and were then packed inside the cavity of a molding die having a cavity of dimensions 400 mm×300 mm×50 mm, heating was subsequently conducted by injecting steam into the molding die at 0.20 MPa for 50 seconds, and the system was then cooled until the maximum surface pressure of the foamed molded product fell to 0.001 MPa, thereby completing formation of a foamed molded product. Under these molding conditions, a foamed molded product having favorable external appearance and fusion was obtained. Using the thus obtained carbon-containing modified polystyrene type resin foamed molded product, measurements were conducted of the foam expansion ratio, the dimensional change upon heating, the chemical resistance, the degree of blackness, and the combustion rate.

Example 9

1,880 g of a polypropylene type resin (product name: PC540R, manufactured by SunAllomer Ltd., melting point: 132° C.) and 120 g of a furnace black (product name: MA230, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 800 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 400 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 135° C., which is 3° C. higher than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 120° C., which is 12° C. lower than the melting point of the carbon-containing polypropylene type resin particles, 1.5 g of sodium dodecylbenzenesulfonate was added to the suspension, and then 800 g of the styrene monomer containing 3.6 g of dicumyl peroxide dissolved therein as a polymerization initiator was added dropwise to the suspension over a period of 4 hours, thereby absorbing the styrene monomer into the carbon-containing polypropylene type resin particles while effecting a polymerization (the second polymerization).

Following completion of the dropwise addition, the temperature was held at 120° C. for one hour, and the temperature was then increased to 140° C. and held for a further 3 hours to complete the polymerization, thus yielding carbon-containing modified polystyrene type resin particles. Subsequently, the temperature of the reaction system was reduced to 60° C., 100 g of tri(2,3-dibromopropyl) isocyanate (manufactured by Nippon Kasei Chemical Co., Ltd.) was added to the suspension, and following completion of the addition, the temperature of the reaction system was increased to 140° C., and the system was stirred at that temperature for 4 hours, thus forming carbon-containing modified polystyrene type resin particles.

Subsequently, the resin particles were cooled to room temperature, and then removed from the 5 L autoclave. 2 kg of the removed carbon-containing modified polystyrene type resin particles and 2 L of water were returned to the 5 L autoclave fitted with a stirrer, and 300 g of butane as a foaming agent was injected into the 5 L autoclave fitted with a stirrer. Following this injection, the temperature was raised to 70° C., and stirring was continued for 4 hours. The system was then cooled to room temperature, and the suspension was removed from the 5 L autoclave, dewatered and dried, yielding foamable carbon-containing modified polystyrene type resin particles.

The thus obtained foamable carbon-containing modified polystyrene type resin particles were pre-foamed using a bulk foam expansion ratio of 30-fold, thus yielding carbon-containing modified polystyrene type resin foamed particles. Measurements of the absorbance were then conducted using these carbon-containing modified polystyrene type resin foamed particles, and the polystyrene type resin ratio was calculated.

The thus obtained carbon-containing modified polystyrene type resin foamed particles were allowed to stand for one day at room temperature, and were then packed inside the cavity of a molding die having a cavity of dimensions 400 mm×300 mm×50 mm, heating was subsequently conducted by injecting steam into the molding die at 0.20 MPa for 50 seconds, and the system was then cooled until the maximum surface pressure of the foamed molded product fell to 0.001 MPa, thereby completing formation of a foamed molded product. Under these molding conditions, a foamed molded product having favorable external appearance and fusion was obtained. Using the thus obtained carbon-containing modified polystyrene type resin foamed molded product, measurements were conducted of the foam expansion ratio, the dimensional change upon heating, the chemical resistance, the degree of blackness, and the combustion rate.

Example 10

1,880 g of a polypropylene type resin (product name: F-744NP, manufactured by Prime Polymer Co., Ltd., melting point: 140° C.) and 120 g of a furnace black (product name: #650B, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 600 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 300 g of a styrene monomer with 0.6 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 135° C., which is 5° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 120° C., which is 20° C. lower than the melting point of the carbon-containing polypropylene type resin particles, 1.5 g of sodium dodecylbenzenesulfonate was added to the suspension, and then 1,100 g of the styrene monomer containing 4.2 g of dicumyl peroxide dissolved therein as a polymerization initiator was added dropwise to the suspension over a period of 5 hours and 30 minutes, thereby absorbing the styrene monomer into the carbon-containing polypropylene type resin particles while effecting a polymerization (the second polymerization).

Following completion of the dropwise addition, the temperature was held at 120° C. for one hour, and the temperature was then increased to 140° C. and held for a further 3 hours to complete the polymerization, thus yielding carbon-containing modified polystyrene type resin particles. Subsequently, the temperature of the reaction system was reduced to 60° C., 40 g of tri(2,3-dibromopropyl) isocyanate (manufactured by Nippon Kasei Chemical Co., Ltd.) and 20 g of 2,3-dimethyl-2,3-diphenylbutane (manufactured by Kayaku Akzo Corporation) were added to the suspension, and following completion of the addition, the temperature of the reaction system was increased to 140° C., and the system was stirred at that temperature for 4 hours, thus forming carbon-containing modified polystyrene type resin particles having self-extinguishing properties.

Subsequently, the resin particles were cooled to room temperature, and then removed from the 5 L autoclave. 2 kg of the removed self-extinguishing carbon-containing modified polystyrene type resin particles and 2 L of water were returned to the 5 L autoclave fitted with a stirrer, and 300 g of butane as a foaming agent was injected into the 5 L autoclave fitted with a stirrer. Following this injection, the temperature was raised to 70° C., and stirring was continued for 4 hours. The system was then cooled to room temperature, and the suspension was removed from the 5 L autoclave, dewatered and dried, yielding foamable carbon-containing modified polystyrene type resin particles.

The thus obtained foamable carbon-containing modified polystyrene type resin particles were pre-foamed using a bulk foam expansion ratio of 30-fold, thus yielding carbon-containing modified polystyrene type resin foamed particles. Measurements of the absorbance were then conducted using these carbon-containing modified polystyrene type resin foamed particles, and the polystyrene type resin ratio was calculated.

The thus obtained carbon-containing modified polystyrene type resin foamed particles were allowed to stand for one day at room temperature, and were then packed inside the cavity of a molding die having a cavity of dimensions 400 mm×300 mm×50 mm, heating was subsequently conducted by injecting steam into the molding die at 0.20 MPa for 50 seconds, and the system was then cooled until the maximum surface pressure of the foamed molded product fell to 0.001 MPa, thereby completing formation of a foamed molded product. Under these molding conditions, a foamed molded product having favorable external appearance and fusion was obtained. Using the thus obtained self-extinguishing carbon-containing modified polystyrene type resin foamed molded product, measurements were conducted of the foam expansion ratio, the dimensional change upon heating, the chemical resistance, the degree of blackness, and the combustion rate.

Example 11

1,940 g of a polypropylene type resin (product name: F-744NP, manufactured by Prime Polymer Co., Ltd., melting point: 140° C.) and 60 g of a furnace black (product name: #650B, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 3% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 800 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 400 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 135° C., which is 5° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 120° C., which is 20° C. lower than the melting point of the carbon-containing polypropylene type resin particles, 1.5 g of sodium dodecylbenzenesulfonate was added to the suspension, and with the exception of then adding dropwise to the suspension over a period of 4 hours, 800 g of the styrene monomer containing 3.6 g of dicumyl peroxide (manufactured by NOF Corporation) dissolved therein as a polymerization initiator, thereby absorbing the styrene monomer into the carbon-containing polypropylene type resin particles while effecting a polymerization (the second polymerization), carbon-containing modified polystyrene type resin foamed particles having self-extinguishing properties were obtained in the same manner as example 10. Measurements of the absorbance were then conducted using these carbon-containing modified polystyrene type resin foamed particles, and the polystyrene type resin ratio was calculated.

Furthermore, using the thus obtained carbon-containing modified polystyrene type resin foamed particles, a carbon-containing modified polystyrene type resin foamed molded product was obtained in the same manner as example 10. Using the thus obtained carbon-containing modified polystyrene type resin foamed molded product, measurements were conducted of the foam expansion ratio, the dimensional change upon heating, the chemical resistance, the degree of blackness, and the combustion rate.

Example 12

1,880 g of a polypropylene type resin (product name: F-744NP, manufactured by Prime Polymer Co., Ltd., melting point: 140° C.) and 120 g of a furnace black (product name: #650B, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 1,000 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 500 g of a styrene monomer with 1.0 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 135° C., which is 5° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 120° C., which is 20° C. lower than the melting point of the carbon-containing polypropylene type resin particles, 1.5 g of sodium dodecylbenzenesulfonate was added to the suspension, and then 500 g of the styrene monomer containing 3 g of dicumyl peroxide dissolved therein as a polymerization initiator was added dropwise to the suspension over a period of 2 hours and 30 minutes, thereby absorbing the styrene monomer into the carbon-containing polypropylene type resin particles while effecting a polymerization (the second polymerization). Following completion of the dropwise addition, the temperature was held at 120° C. for one hour, and the temperature was then increased to 140° C. and held for a further 3 hours to complete the polymerization, thus yielding carbon-containing modified polystyrene type resin particles.

Subsequently, the temperature of the reaction system was reduced to 60° C., and with the exceptions of adding 100 g of tri(2,3-dibromopropyl) isocyanate (manufactured by Nippon Kasei Chemical Co., Ltd.) and 40 g of 2,3-dimethyl-2,3-diphenylbutane (manufactured by Kayaku Akzo Corporation) to the suspension, and following completion of the addition, increasing the temperature of the reaction system to 140° C. and stirring the system at that temperature for 4 hours to form carbon-containing modified polystyrene type resin particles having self-extinguishing properties, carbon-containing modified polystyrene type resin foamed particles were obtained in the same manner as example 10. Measurements of the absorbance were then conducted using these carbon-containing modified polystyrene type resin foamed particles, and the polystyrene type resin ratio was calculated.

Furthermore, using the thus obtained carbon-containing modified polystyrene type resin foamed particles, a carbon-containing modified polystyrene type resin foamed molded product was obtained in the same manner as example 10. Using the thus obtained carbon-containing modified polystyrene type resin foamed molded product, measurements were conducted of the foam expansion ratio, the dimensional change upon heating, the chemical resistance, the degree of blackness, and the combustion rate.

Example 13

1,880 g of a polypropylene type resin (product name: F-744NP, manufactured by Prime Polymer Co., Ltd., melting point: 140° C.) and 120 g of a furnace black (product name: #650B, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 800 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 400 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 135° C., which is 5° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 120° C., which is 20° C. lower than the melting point of the carbon-containing polypropylene type resin particles, 1.5 g of sodium dodecylbenzenesulfonate was added to the suspension, and then 800 g of the styrene monomer containing 3.6 g of dicumyl peroxide dissolved therein as a polymerization initiator was added dropwise to the suspension over a period of 4 hours, thereby absorbing the styrene monomer into the carbon-containing polypropylene type resin particles while effecting a polymerization (the second polymerization).

Following completion of the dropwise addition, the temperature was held at 120° C. for one hour, and the temperature was then increased to 140° C. and held for a further 3 hours to complete the polymerization, thus yielding carbon-containing modified polystyrene type resin particles.

Subsequently, the temperature of the reaction system was reduced to 60° C., and with the exceptions of adding 100 g of tri(2,3-dibromopropyl) isocyanate (manufactured by Nippon Kasei Chemical Co., Ltd.) and 40 g of 2,3-dimethyl-2,3-diphenylbutane (manufactured by Kayaku Akzo Corporation) to the suspension, and following completion of the addition, increasing the temperature of the reaction system to 140° C. and stirring the system at that temperature for 4 hours to form carbon-containing modified polystyrene type resin particles having self-extinguishing properties, carbon-containing modified polystyrene type resin foamed particles were obtained in the same manner as example 10. Measurements of the absorbance were then conducted using these carbon-containing modified polystyrene type resin foamed particles, and the polystyrene type resin ratio was calculated.

Furthermore, using the thus obtained carbon-containing modified polystyrene type resin foamed particles, a carbon-containing modified polystyrene type resin foamed molded product was obtained in the same manner as example 10. Using the thus obtained carbon-containing modified polystyrene type resin foamed molded product, measurements were conducted of the foam expansion ratio, the dimensional change upon heating, the chemical resistance, the degree of blackness, and the combustion rate.

Example 14

1,940 g of a polypropylene type resin (product name: F-744NP, manufactured by Prime Polymer Co., Ltd., melting point: 140° C.) and 60 g of a furnace black (product name: #650B, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 3% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 800 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 400 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 135° C., which is 5° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 120° C., which is 20° C. lower than the melting point of the carbon-containing polypropylene type resin particles, 1.5 g of sodium dodecylbenzenesulfonate was added to the suspension, and then 800 g of the styrene monomer containing 3.6 g of dicumyl peroxide dissolved therein as a polymerization initiator was added dropwise to the suspension over a period of 4 hours, thereby absorbing the styrene monomer into the carbon-containing polypropylene type resin particles while effecting a polymerization (the second polymerization).

Following completion of the dropwise addition, the temperature was held at 120° C. for one hour, and the temperature was then increased to 140° C. and held for a further 3 hours to complete the polymerization, thus yielding carbon-containing modified polystyrene type resin particles.

Subsequently, the temperature of the reaction system was reduced to 60° C., and with the exceptions of adding 40 g of tri(2,3-dibromopropyl) isocyanate (manufactured by Nippon Kasei Chemical Co., Ltd.) and 20 g of dicumyl peroxide (manufactured by NOF Corporation) to the suspension, and following completion of the addition, increasing the temperature of the reaction system to 140° C. and stirring the system at that temperature for 4 hours to form carbon-containing modified polystyrene type resin particles having self-extinguishing properties, carbon-containing modified polystyrene type resin foamed particles were obtained in the same manner as example 10. Measurements of the absorbance were then conducted using these carbon-containing modified polystyrene type resin foamed particles, and the polystyrene type resin ratio was calculated.

Furthermore, using the thus obtained carbon-containing modified polystyrene type resin foamed particles, a carbon-containing modified polystyrene type resin foamed molded product was obtained in the same manner as example 10. Using the thus obtained carbon-containing modified polystyrene type resin foamed molded product, measurements were conducted of the foam expansion ratio, the dimensional change upon heating, the chemical resistance, the degree of blackness, and the combustion rate.

Example 15

1,940 g of a polypropylene type resin (product name: PC540R, manufactured by SunAllomer Ltd., melting point: 132° C.) and 60 g of a furnace black (product name: #650B, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 3% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 800 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 400 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 140° C., which is 8° C. higher than the melting point of the carbon-containing polypropylene type resin particles, and this temperature was held for 2 hours, thereby polymerizing the styrene monomer inside the carbon-containing polypropylene type resin particles (the first polymerization).

Subsequently, with the exceptions of adjusting the reaction liquid from the first polymerization to a temperature of 125° C., which is 7° C. lower than the melting point of the carbon-containing polypropylene type resin particles, adding 1.5 g of sodium dodecylbenzenesulfonate to the suspension, and then adding dropwise to the suspension over a period of 4 hours, 800 g of the styrene monomer containing 3.6 g of dicumyl peroxide dissolved therein as a polymerization initiator, thereby absorbing the styrene monomer into the carbon-containing polypropylene type resin particles while effecting a polymerization (the second polymerization), carbon-containing modified polystyrene type resin foamed particles were obtained in the same manner as example 10. Measurements of the absorbance were then conducted using these carbon-containing modified polystyrene type resin foamed particles, and the polystyrene type resin ratio was calculated.

Furthermore, using the thus obtained carbon-containing modified polystyrene type resin foamed particles, a carbon-containing modified polystyrene type resin foamed molded product was obtained in the same manner as example 10. Using the thus obtained carbon-containing modified polystyrene type resin foamed molded product, measurements were conducted of the foam expansion ratio, the dimensional change upon heating, the chemical resistance, the degree of blackness, and the combustion rate.

Comparative Example 1

1,880 g of a polypropylene type resin (product name: F-744NP, manufactured by Prime Polymer Co., Ltd., melting point: 140° C.) and 120 g of a furnace black (product name: CF9, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Thereafter, carbon-containing modified polystyrene type resin foamed particles were obtained in the same manner as example 1, measurements of the absorbance were then conducted using these carbon-containing modified polystyrene type resin foamed particles, and the polystyrene type resin ratio was calculated.

Subsequently, a carbon-containing modified polystyrene type resin foamed molded product was produced in the same manner as example 1. Using the thus obtained carbon-containing modified polystyrene type resin foamed molded product, measurements were conducted of the foam expansion ratio, the dimensional change upon heating, the chemical resistance, and the degree of blackness.

Comparative Example 2

1,880 g of a polypropylene type resin (product name: F-744NP, manufactured by Prime Polymer Co., Ltd., melting point: 140° C.) and 120 g of a furnace black (product name: #2600, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Thereafter, an attempt was made to prepare carbon-containing modified polystyrene type resin foamed particles (bulk foam expansion ratio: 30-fold) in the same manner as example 1, but the foaming properties were poor, and only foamed particles having a bulk foam expansion ratio of 15-fold could be obtained. Measurements of the absorbance were then conducted using these carbon-containing modified polystyrene type resin foamed particles, and the polystyrene type resin ratio was calculated.

A foamed molded product with a foam expansion ratio of 30-fold could not be obtained.

Comparative Example 3

1,880 g of a polypropylene type resin (product name: F-744NP, manufactured by Prime Polymer Co., Ltd., melting point: 140° C.) and 120 g of a furnace black (product name: #900, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 800 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 400 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 120° C., which is 20° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 110° C., which is 30° C. lower than the melting point of the carbon-containing polypropylene type resin particles, 1.5 g of sodium dodecylbenzenesulfonate was added to the suspension, and then 800 g of the styrene monomer containing 3.6 g of dicumyl peroxide dissolved therein as a polymerization initiator was added dropwise to the suspension over a period of 4 hours, thereby absorbing the styrene monomer into the carbon-containing polypropylene type resin particles while effecting a polymerization (the second polymerization).

Following completion of the dropwise addition, with the exceptions of holding the temperature at 110° C. for one hour, and then increasing the temperature to 140° C. and holding that temperature for a further 3 hours to complete the polymerization and obtain carbon-containing modified polystyrene type resin particles, foamable carbon-containing modified polystyrene type resin particles were obtained in the same manner as example 1.

Subsequently, an attempt was made to prepare carbon-containing modified polystyrene type resin foamed particles (bulk foam expansion ratio: 30-fold) in the same manner as example 1, but the foaming properties were poor, and only foamed particles having a bulk foam expansion ratio of 15-fold could be obtained. Measurements of the absorbance were then conducted using these carbon-containing modified polystyrene type resin foamed particles, and the polystyrene type resin ratio was calculated.

A foamed molded product with a foam expansion ratio of 30-fold could not be obtained.

Comparative Example 4

1,880 g of a polypropylene type resin (product name: F-744NP, manufactured by Prime Polymer Co., Ltd., melting point: 140° C.) and 120 g of a furnace black (product name: #900, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 800 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 400 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 135° C., which is 5° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 110° C., which is 30° C. lower than the melting point of the carbon-containing polypropylene type resin particles, 1.5 g of sodium dodecylbenzenesulfonate was added to the suspension, and then 800 g of the styrene monomer containing 3.6 g of dicumyl peroxide dissolved therein as a polymerization initiator was added dropwise to the suspension over a period of 4 hours, thereby absorbing the styrene monomer into the carbon-containing polypropylene type resin particles while effecting a polymerization (the second polymerization).

Following completion of the dropwise addition, with the exceptions of holding the temperature at 110° C. for one hour, and then increasing the temperature to 140° C. and holding that temperature for a further 3 hours to complete the polymerization and obtain carbon-containing modified polystyrene type resin particles, foamable carbon-containing modified polystyrene type resin particles were obtained in the same manner as example 1.

Thereafter, carbon-containing modified polystyrene type resin foamed particles were obtained in the same manner as example 1, measurements of the absorbance were then conducted using these carbon-containing modified polystyrene type resin foamed particles, and the polystyrene type resin ratio was calculated.

Subsequently, a carbon-containing modified polystyrene type resin foamed molded product was produced in the same manner as example 1. Using the thus obtained carbon-containing modified polystyrene type resin foamed molded product, measurements were conducted of the foam expansion ratio, the dimensional change upon heating, the chemical resistance, and the degree of blackness.

Comparative Example 5

1,880 g of a polypropylene type resin (product name: PC540R, manufactured by SunAllomer Ltd., melting point: 132° C.) and 120 g of a furnace black (product name: #900, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 800 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 400 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 145° C., which is 13° C. higher than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 145° C., which is 13° C. higher than the melting point of the carbon-containing polypropylene type resin particles, 1.5 g of sodium dodecylbenzenesulfonate was added to the suspension, and then 800 g of the styrene monomer containing 3.6 g of dicumyl peroxide dissolved therein as a polymerization initiator was added dropwise to the suspension over a period of 4 hours, thereby absorbing the styrene monomer into the carbon-containing polypropylene type resin particles while effecting a polymerization (the second polymerization).

Following completion of the dropwise addition, with the exceptions of holding the temperature at 145° C. for one hour, and then holding that temperature for a further 3 hours to complete the polymerization and obtain carbon-containing modified polystyrene type resin particles, foamable carbon-containing modified polystyrene type resin particles were obtained in the same manner as example 1.

Subsequently, an attempt was made to prepare carbon-containing modified polystyrene type resin foamed particles (bulk foam expansion ratio: 30-fold) in the same manner as example 1, but the foaming properties were poor, and only foamed particles having a bulk foam expansion ratio of 15-fold could be obtained. Measurements of the absorbance were then conducted using these carbon-containing modified polystyrene type resin foamed particles, and the polystyrene type resin ratio was calculated.

A foamed molded product with a foam expansion ratio of 30-fold could not be obtained.

Comparative Example 6

1,880 g of a polypropylene type resin (product name: F-744NP, manufactured by Prime Polymer Co., Ltd., melting point: 140° C.) and 120 g of a furnace black (product name: #900, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin.

The conditions were adjusted so that the weight of 100 of these carbon-containing polypropylene type resin particles was 80 mg, and the average particle diameter was approximately 1 mm.

Subsequently, 1,200 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 400 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 135° C., which is 5° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 120° C., which is 20° C. lower than the melting point of the carbon-containing polypropylene type resin particles, 1.5 g of sodium dodecylbenzenesulfonate was added to the suspension, and then 400 g of the styrene monomer containing 2.4 g of dicumyl peroxide dissolved therein as a polymerization initiator was added dropwise to the suspension over a period of 2 hours, thereby absorbing the styrene monomer into the carbon-containing polypropylene type resin particles while effecting a polymerization (the second polymerization).

Following completion of the dropwise addition, with the exceptions of holding the temperature at 120° C. for one hour, and then increasing the temperature to 140° C. and holding that temperature for a further 3 hours to complete the polymerization and obtain carbon-containing modified polystyrene type resin particles, foamable carbon-containing modified polystyrene type resin particles were obtained in the same manner as example 1.

Subsequently, an attempt was made to prepare carbon-containing modified polystyrene type resin foamed particles (bulk foam expansion ratio: 30-fold) in the same manner as example 1, but the foaming properties were poor, and only foamed particles having a bulk foam expansion ratio of 10-fold could be obtained.

A foamed molded product with a foam expansion ratio of 30-fold could not be obtained.

Comparative Example 7

1,880 g of a polypropylene type resin (product name: F-744NP, manufactured by Prime Polymer Co., Ltd., melting point: 140° C.) and 120 g of a furnace black (product name: #900, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin.

The conditions were adjusted so that the weight of 100 of these carbon-containing polypropylene type resin particles was 80 mg, and the average particle diameter was approximately 1 mm.

Subsequently, 200 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 100 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 135° C., which is 5° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 120° C., which is 20° C. lower than the melting point of the carbon-containing polypropylene type resin particles, 1.5 g of sodium dodecylbenzenesulfonate was added to the suspension, and then 1,700 g of the styrene monomer containing 5.4 g of dicumyl peroxide dissolved therein as a polymerization initiator was added dropwise to the suspension over a period of 8 hours and 30 minutes, thereby absorbing the styrene monomer into the carbon-containing polypropylene type resin particles while effecting a polymerization (the second polymerization).

Following completion of the dropwise addition, with the exceptions of holding the temperature at 120° C. for one hour, and then increasing the temperature to 140° C. and holding that temperature for a further 3 hours to complete the polymerization and obtain carbon-containing modified polystyrene type resin particles, foamable carbon-containing modified polystyrene type resin particles were obtained in the same manner as example 1.

Thereafter, carbon-containing modified polystyrene type resin foamed particles were obtained in the same manner as example 1.

Subsequently, a carbon-containing modified polystyrene type resin foamed molded product was produced in the same manner as example 1. Using the thus obtained carbon-containing modified polystyrene type resin foamed molded product, measurements were conducted of the foam expansion ratio, the dimensional change upon heating, and the chemical resistance.

Comparative Example 8

1,880 g of a polypropylene type resin (product name: F-744NP, manufactured by Prime Polymer Co., Ltd., melting point: 140° C.) and 120 g of a furnace black (product name: #650B, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 600 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 300 g of a styrene monomer with 0.6 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 120° C., which is 20° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, with the exceptions of adjusting the reaction liquid from the first polymerization to a temperature of 110° C., which is 30° C. lower than the melting point of the carbon-containing polypropylene type resin particles, adding 1.5 g of sodium dodecylbenzenesulfonate to the suspension, and then adding dropwise to the suspension over a period of 5 hours and 30 minutes, 1,100 g of the styrene monomer containing 4.2 g of dicumyl peroxide dissolved therein as a polymerization initiator, thereby absorbing the styrene monomer into the carbon-containing polypropylene type resin particles while effecting a polymerization (the second polymerization), carbon-containing modified polystyrene type resin foamed particles were obtained in the same manner as example 10. Measurements of the absorbance were then conducted using these carbon-containing modified polystyrene type resin foamed particles, and the polystyrene type resin ratio was calculated.

Furthermore, using the thus obtained carbon-containing modified polystyrene type resin foamed particles, a carbon-containing modified polystyrene type resin foamed molded product was obtained in the same manner as example 10. Using the thus obtained carbon-containing modified polystyrene type resin foamed molded product, measurements were conducted of the foam expansion ratio, the dimensional change upon heating, the chemical resistance, the degree of blackness, and the combustion rate.

Comparative Example 9

1,940 g of a polypropylene type resin (product name: F-744NP, manufactured by Prime Polymer Co., Ltd., melting point: 140° C.) and 60 g of a furnace black (product name: #650B, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 3% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 800 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 400 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 120° C., which is 20° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, with the exceptions of adjusting the reaction liquid from the first polymerization to a temperature of 110° C., which is 30° C. lower than the melting point of the carbon-containing polypropylene type resin particles, adding 1.5 g of sodium dodecylbenzenesulfonate to the suspension, and then adding dropwise to the suspension over a period of 4 hours, 800 g of the styrene monomer containing 3.6 g of dicumyl peroxide dissolved therein as a polymerization initiator, thereby absorbing the styrene monomer into the carbon-containing polypropylene type resin particles while effecting a polymerization (the second polymerization), carbon-containing modified polystyrene type resin foamed particles were obtained in the same manner as example 10. Measurements of the absorbance were then conducted using these carbon-containing modified polystyrene type resin foamed particles, and the polystyrene type resin ratio was calculated.

Furthermore, using the thus obtained carbon-containing modified polystyrene type resin foamed particles, a carbon-containing modified polystyrene type resin foamed molded product was obtained in the same manner as example 10. Using the thus obtained carbon-containing modified polystyrene type resin foamed molded product, measurements were conducted of the foam expansion ratio, the dimensional change upon heating, the chemical resistance, the degree of blackness, and the combustion rate.

Comparative Example 10

1,940 g of a polypropylene type resin (product name: F-744NP, manufactured by Prime Polymer Co., Ltd., melting point: 140° C.) and 60 g of a furnace black (product name: #650B, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 3% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 1,000 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 500 g of a styrene monomer with 1.0 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 120° C., which is 20° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 110° C., which is 30° C. lower than the melting point of the carbon-containing polypropylene type resin particles, 1.5 g of sodium dodecylbenzenesulfonate was added to the suspension, and then 500 g of the styrene monomer containing 3 g of dicumyl peroxide dissolved therein as a polymerization initiator was added dropwise to the suspension over a period of 2 hours and 30 minutes, thereby absorbing the styrene monomer into the carbon-containing polypropylene type resin particles while effecting a polymerization (the second polymerization).

Following completion of the dropwise addition, the temperature was held at 120° C. for one hour, and the temperature was then increased to 140° C. and held for a further 3 hours to complete the polymerization, thus yielding carbon-containing modified polystyrene type resin particles.

Subsequently, the temperature of the reaction system was reduced to 60° C., and with the exceptions of adding 100 g of tri(2,3-dibromopropyl) isocyanate (manufactured by Nippon Kasei Chemical Co., Ltd.) and 20 g of 2,3-dimethyl-2,3-diphenylbutane (manufactured by Kayaku Akzo Corporation) to the suspension, and following completion of the addition, increasing the temperature of the reaction system to 140° C. and stirring the system at that temperature for 4 hours, thus forming carbon-containing modified polystyrene type resin particles, carbon-containing modified polystyrene type resin foamed particles were obtained in the same manner as example 10. Measurements of the absorbance were then conducted using these carbon-containing modified polystyrene type resin foamed particles, and the polystyrene type resin ratio was calculated.

Furthermore, using the thus obtained carbon-containing modified polystyrene type resin foamed particles, a carbon-containing modified polystyrene type resin foamed molded product was obtained in the same manner as example 10. Using the thus obtained carbon-containing modified polystyrene type resin foamed molded product, measurements were conducted of the foam expansion ratio, the dimensional change upon heating, the chemical resistance, the degree of blackness, and the combustion rate.

Comparative Example 11

1,880 g of a polypropylene type resin (product name: PC540R, manufactured by SunAllomer Ltd., melting point: 132° C.) and 120 g of a furnace black (product name: #650B, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 800 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 400 g of a styrene monomer with 0.8 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 140° C., which is 8° C. higher than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 145° C., which is 13° C. higher than the melting point of the carbon-containing polypropylene type resin particles, 1.5 g of sodium dodecylbenzenesulfonate was added to the suspension, and then 800 g of the styrene monomer containing 3.6 g of dicumyl peroxide dissolved therein as a polymerization initiator was added dropwise to the suspension over a period of 4 hours, thereby absorbing the styrene monomer into the carbon-containing polypropylene type resin particles while effecting a polymerization (the second polymerization).

Following completion of the dropwise addition, the temperature was held at 120° C. for one hour, and the temperature was then increased to 140° C. and held for a further 3 hours to complete the polymerization, thus yielding carbon-containing modified polystyrene type resin particles.

Subsequently, the temperature of the reaction system was reduced to 60° C., and with the exceptions of adding 100 g of tri(2,3-dibromopropyl) isocyanate (manufactured by Nippon Kasei Chemical Co., Ltd.) and 40 g of 2,3-dimethyl-2,3-diphenylbutane (manufactured by Kayaku Akzo Corporation) to the suspension, and following completion of the addition, increasing the temperature of the reaction system to 140° C. and stirring the system at that temperature for 4 hours, thus forming carbon-containing modified polystyrene type resin particles, carbon-containing modified polystyrene type resin foamed particles were obtained in the same manner as example 10. Measurements of the absorbance were then conducted using these carbon-containing modified polystyrene type resin foamed particles, and the polystyrene type resin ratio was calculated.

Furthermore, using the thus obtained carbon-containing modified polystyrene type resin foamed particles, a carbon-containing modified polystyrene type resin foamed molded product was obtained in the same manner as example 10. Using the thus obtained carbon-containing modified polystyrene type resin foamed molded product, measurements were conducted of the foam expansion ratio, the dimensional change upon heating, the chemical resistance, and the combustion rate.

Comparative Example 12

1,880 g of a polypropylene type resin (product name: F-744NP, manufactured by Prime Polymer Co., Ltd., melting point: 140° C.) and 120 g of a furnace black (product name: #650B, manufactured by Mitsubishi Chemical Corporation) were mixed, the resulting mixture was supplied to an extruder, and molten kneading and strand cutting were used to pelletize the mixture and form spherical (egg-shaped) carbon-containing polypropylene type resin particles in which 6% by weight of the furnace black had been incorporated within the polypropylene type resin. The conditions were adjusted so that the weight of 100 of these carbon-containing polypropylene type resin particles was 80 mg, and the average particle diameter was approximately 1 mm.

Subsequently, 600 g of these carbon-containing polypropylene type resin particles were placed in a 5 L autoclave fitted with a stirrer, 2 kg of pure water as an aqueous medium, 20 g of magnesium pyrophosphate and 0.5 g of sodium dodecylbenzenesulfonate were added, the mixture was stirred to generate a suspension within the aqueous medium, stirring was continued for 10 minutes, and the temperature was then raised to 60° C., yielding an aqueous suspension.

Subsequently, 300 g of a styrene monomer with 0.6 g of dicumyl peroxide dissolved therein was added dropwise to the aqueous suspension over a period of 30 minutes. Following completion of the dropwise addition, stirring was continued for 30 minutes, thereby absorbing the styrene monomer into the carbon-containing polypropylene type resin particles.

The temperature of the reaction system was then raised to 120° C., which is 20° C. lower than the melting point of the carbon-containing polypropylene type resin particles, and this temperature was held for 2 hours, thereby polymerizing the styrene monomer inside the carbon-containing polypropylene type resin particles (the first polymerization).

Subsequently, the reaction liquid from the first polymerization was adjusted to a temperature of 110° C., which is 30° C. lower than the melting point of the carbon-containing polypropylene type resin particles, 1.5 g of sodium dodecylbenzenesulfonate was added to the suspension, and then 1,100 g of the styrene monomer containing 4.2 g of dicumyl peroxide dissolved therein as a polymerization initiator was added dropwise to the suspension over a period of 5 hours and 30 minutes, thereby absorbing the styrene monomer into the carbon-containing polypropylene type resin particles while effecting a polymerization (the second polymerization).

Following completion of the dropwise addition, the temperature was held at 120° C. for one hour, and the temperature was then increased to 140° C. and held for a further 3 hours to complete the polymerization, thus yielding carbon-containing modified polystyrene type resin particles.

Subsequently, the temperature of the reaction system was reduced to 60° C., and with the exceptions of adding 80 g of tri(2,3-dibromopropyl) isocyanate (manufactured by Nippon Kasei Chemical Co., Ltd.) and 30 g of 2,3-dimethyl-2,3-diphenylbutane (manufactured by Kayaku Akzo Corporation) to the suspension, and following completion of the addition, increasing the temperature of the reaction system to 140° C. and stirring the system at that temperature for 4 hours, thus forming self-extinguishing carbon-containing modified polystyrene type resin particles, self-extinguishing carbon-containing modified polystyrene type resin foamed particles were obtained in the same manner as example 10. Measurements of the absorbance were then conducted using these self-extinguishing carbon-containing modified polystyrene type resin foamed particles, and the polystyrene type resin ratio was calculated.

Furthermore, using the thus obtained self-extinguishing carbon-containing modified polystyrene type resin foamed particles, a self-extinguishing carbon-containing modified polystyrene type resin foamed molded product was obtained in the same manner as example 10. Using the thus obtained self-extinguishing carbon-containing modified polystyrene type resin foamed molded product, measurements were conducted of the foam expansion ratio, the dimensional change upon heating, the chemical resistance, the degree of blackness, and the combustion rate.

The production conditions for examples 1 to 15, and the measurement results and evaluation results of the various tests performed on the obtained carbon-containing modified polystyrene type resin foamed particles and the foamed molded products are detailed in Tables 1 and 2.

The production conditions for comparative examples 1 to 12, and the measurement results and evaluation results of the various tests performed on the obtained carbon-containing modified polystyrene type resin foamed particles and the foamed molded products are detailed in Tables 3 and 4.

In Tables 1 to 4, "QP" represents the polypropylene type resin, and "SM" represents the polystyrene type resin.

Further, in Tables 1 to 4, polypropylene resin "A" represents the product F-744NP manufactured by Prime Polymer Co., Ltd., whereas polypropylene resin "B" represents the product PC540R manufactured by SunAllomer Ltd.

TABLE 1

| | Resin (QP) | | | Carbon particle diameter [nm] | Amount of carbon added [weight %/ polymer] | Polymerization temperature | | Blend amount of flame retardant [weight %/ polymer] | Blend amount of flame retardant assistant [weight %/ polymer] | |
|---|---|---|---|---|---|---|---|---|---|---|
| | Type | Melting point [° C.] | QP/SM | | | First polymerization [° C.] | Second polymerization [° C.] | | A | B |
| Example 1 | A | 140 | 40/60 | 16 | 2.4 | 135 | 120 | — | — | — |
| Example 2 | A | 140 | 30/70 | 16 | 1.8 | 135 | 120 | — | — | — |
| Example 3 | A | 140 | 50/50 | 16 | 3.0 | 135 | 120 | — | — | — |
| Example 4 | A | 140 | 40/60 | 16 | 1.2 | 135 | 120 | — | — | — |
| Example 5 | A | 140 | 40/60 | 16 | 3.2 | 135 | 120 | — | — | — |
| Example 6 | A | 140 | 40/60 | 30 | 2.4 | 135 | 120 | — | — | — |
| Example 7 | B | 132 | 40/60 | 16 | 2.4 | 140 | 125 | — | — | — |
| Example 8 | B | 132 | 30/70 | 30 | 1.8 | 135 | 120 | 2.0 | — | — |
| Example 9 | B | 132 | 50/50 | 30 | 5.0 | 135 | 120 | 5.0 | — | — |
| Example 10 | A | 140 | 30/70 | 22 | 6.0 | 135 | 120 | 2.0 | 1.0 | — |
| Example 11 | A | 140 | 40/60 | 22 | 3.0 | 135 | 120 | 2.0 | 1.0 | — |
| Example 12 | A | 140 | 50/50 | 22 | 6.0 | 135 | 120 | 5.0 | 2.0 | — |
| Example 13 | A | 140 | 40/60 | 22 | 6.0 | 135 | 120 | 5.0 | 2.0 | — |
| Example 14 | A | 140 | 40/60 | 22 | 3.0 | 135 | 120 | 2.0 | — | 1.0 |
| Example 15 | B | 132 | 40/60 | 22 | 3.0 | 140 | 125 | 2.0 | 1.0 | — |

TABLE 2

| | Viability of foaming or molding at 30-fold bulk foam expansion ratio | Chemical resistance of molded product with bulk foam expansion ratio of 30 | Dimensional change upon heating for molded product with bulk foam expansion ratio of 30 | Combustion rate of molded product with bulk foam expansion ratio of 30 | Degree of blackness of molded product with bulk foam expansion ratio of 30-fold L* | Degree of blackness of molded product with bulk foam expansion ratio of 30-fold Color irregularity | Amount of PS in central part of particle/ amount of PS in overall particle | D698/D1376 within particle surface layer |
|---|---|---|---|---|---|---|---|---|
| Example 1 | ○ | ○ | ○ | — | 18.9(○) | ○ | 1.45 | 1.02 |
| Example 2 | ○ | ○ | ○ | — | 19.0(○) | ○ | 1.40 | 1.27 |
| Example 3 | ○ | ○ | ○ | — | 16.8(○) | ○ | 1.48 | 0.90 |
| Example 4 | ○ | ○ | ○ | — | 20.5(Δ) | ○ | 1.43 | 1.06 |
| Example 5 | ○ | ○ | ○ | — | 16.4(○) | ○ | 1.44 | 1.05 |
| Example 6 | ○ | ○ | ○ | — | 20.1(Δ) | ○ | 1.44 | 1.05 |
| Example 7 | ○ | ○ | ○ | — | 18.1(○) | ○ | 1.44 | 1.03 |
| Example 8 | ○ | ○ | ○ | ○ | 19.5(○) | ○ | 1.38 | 1.30 |
| Example 9 | ○ | ○ | ○ | ○ | 15.0(○) | ○ | 1.45 | 0.95 |
| Example 10 | ○ | ○ | ○ | ○ | 16.1(○) | ○ | 1.40 | 1.27 |
| Example 11 | ○ | ○ | ○ | ○ | 16.9(○) | ○ | 1.45 | 1.02 |
| Example 12 | ○ | ○ | ○ | ○ | 14.4(○) | ○ | 1.48 | 0.90 |
| Example 13 | ○ | ○ | ○ | ○ | 15.3(○) | ○ | 1.44 | 1.05 |
| Example 14 | ○ | ○ | ○ | ○ | 17.0(○) | ○ | 1.43 | 1.06 |
| Example 15 | ○ | ○ | ○ | ○ | 17.2(○) | ○ | 1.44 | 1.03 |

TABLE 3

| | Resin (QP) Type | Resin (QP) Melting point [°C.] | Resin (QP) QP/SM | Carbon particle diameter [nm] | Amount of carbon added [weight %/ polymer] | Polymerization temperature First polymerization [°C.] | Polymerization temperature Second polymerization [°C.] | Blend amount of flame retardant [weight %/ polymer] | Blend amount of flame retardant assistant [weight %/ polymer] A | Blend amount of flame retardant assistant [weight %/ polymer] B |
|---|---|---|---|---|---|---|---|---|---|---|
| Comparative example 1 | A | 140 | 40/60 | 40 | 2.4 | 135 | 120 | — | — | — |
| Comparative example 2 | A | 140 | 40/60 | 13 | 2.4 | 135 | 120 | — | — | — |
| Comparative example 3 | A | 140 | 40/60 | 16 | 2.4 | 120 | 110 | — | — | — |
| Comparative example 4 | A | 140 | 40/60 | 16 | 2.4 | 135 | 110 | — | — | — |
| Comparative example 5 | B | 132 | 40/60 | 16 | 2.4 | 140 | 145 | — | — | — |
| Comparative example 6 | A | 140 | 60/40 | 16 | 2.4 | 135 | 120 | — | — | — |
| Comparative example 7 | A | 140 | 10/90 | 16 | 2.4 | 135 | 120 | — | — | — |
| Comparative example 8 | A | 140 | 30/70 | 22 | 6.0 | 120 | 110 | 2.0 | 1.0 | — |
| Comparative example 9 | A | 140 | 40/60 | 22 | 3.0 | 120 | 110 | 2.0 | 1.0 | — |
| Comparative example 10 | A | 140 | 50/50 | 22 | 3.0 | 120 | 110 | 5.0 | 1.0 | — |
| Comparative example 11 | B | 132 | 40/60 | 22 | 6.0 | 140 | 145 | 5.0 | 2.0 | — |
| Comparative example 12 | A | 140 | 30/70 | 22 | 6.0 | 120 | 110 | 4.0 | 1.5 | — |

TABLE 4

| | Viability of foaming or molding at 30-fold bulk foam expansion ratio | Chemical resistance of molded product with bulk foam expansion ratio of 30 | Dimensional change upon heating for molded product with bulk foam expansion ratio of 30 | Combustion rate of molded product with bulk foam expansion ratio of 30 | Degree of blackness of molded product with bulk foam expansion ratio of 30-fold L* | Degree of blackness – Color irregularity | Amount of PS in central part of particle/ amount of PS in overall particle | D698/D1376 within particle surface layer |
|---|---|---|---|---|---|---|---|---|
| Comparative example 1 | ○ | Δ | Δ | — | 26(X) | X | 1.16 | 2.13 |
| Comparative example 2 | X | — | — | — | — | — | 1.14 | 2.09 |
| Comparative example 3 | X | — | — | — | — | — | 1.16 | 2.13 |
| Comparative example 4 | ○ | Δ | Δ | — | 26.5(X) | X | 1.15 | 2.11 |
| Comparative example 5 | X | — | — | — | — | — | 1.17 | 2.18 |
| Comparative example 6 | X | — | — | — | — | — | — | — |
| Comparative example 7 | ○ | X | X | — | — | — | — | — |
| Comparative example 8 | ○ | ○ | ○ | X | 25.2(X) | X | 1.12 | 2.88 |
| Comparative example 9 | ○ | ○ | ○ | X | 25.7(X) | X | 1.16 | 2.13 |
| Comparative example 10 | ○ | ○ | X | X | — | — | 1.15 | 1.93 |
| Comparative example 11 | ○ | ○ | X | X | — | — | 1.17 | 2.11 |
| Comparative example 12 | ○ | ○ | X | ○ | — | — | 1.01 | 2.78 |

From the results in Tables 1 to 4 it is evident that the foamed molded products produced in examples 1 to 7 according to the present invention exhibited superior levels of dimensional change upon heating, chemical resistance and degree of blackness when compared with the foamed molded products produced in comparative examples 1 to 7, for which the polystyrene type resin ratio at the central part of the particle was less than 1.2 times the polystyrene type resin ratio of the overall particle, the polystyrene type resin ratio being calculated by using the ratio ($D_{698}/D_{1376}$) of absorbances at 698 cm$^{-1}$ and 1376 cm$^{-1}$ which were obtained from an infrared absorption spectrum measured by ATR infrared spectroscopic analysis.

Further, the foamed molded products produced in examples 1 to 7 exhibited superior foam moldability to the foamed molded product produced in comparative example 2, for which the ratio ($D_{698}/D_{1376}$) of absorbances at 698 cm$^{-1}$ and 1376 cm$^{-1}$ at the particle surface obtained from an infrared absorption spectrum measured by ATR infrared spectroscopic analysis was 2.09.

Further, the foamed molded products produced in examples 1 to 7 exhibited superior foam moldability to the foamed molded product produced in comparative example 3, for which the second polymerization temperature was 30° C. lower than the melting point of the carbon-containing polypropylene type resin particle.

Furthermore, the foamed molded products produced in examples 1 to 7 exhibited superior foam moldability to the foamed molded product produced in comparative example 5, for which the second polymerization temperature was 13° C. higher than the melting point of the carbon-containing polypropylene type resin particle.

Furthermore, the foamed molded products produced in examples 1 to 7 exhibited superior foam moldability to the foamed molded product produced in comparative example 6, which contained approximately 67 parts by weight of the polystyrene type resin per 100 parts by weight of the carbon-containing polypropylene type resin.

Furthermore, from the results in Tables 1 to 4 it is evident that the foamed molded products produced in examples 8 to 15 according to the present invention exhibited superior combustion rates to the foamed molded products produced in comparative examples 8 to 11, for which the polystyrene type resin ratio at the central part of the particle was less than 1.2 times the polystyrene type resin ratio of the overall particle, the polystyrene type resin ratio being calculated by using the ratio ($D_{698}/D_{1376}$) of absorbances at 698 cm$^{-1}$ and 1376 cm$^{-1}$ which were obtained from an infrared absorption spectrum measured by ATR infrared spectroscopic analysis. Further, the foamed molded products produced in examples 8 to 15 also exhibited superior dimensional change upon heating to the foamed molded products produced in comparative examples 10 to 12, for which the polystyrene type resin ratio at the central part of the particle was less than 1.2 times the polystyrene type resin ratio of the overall particle, the polystyrene type resin ratio being calculated by using the ratio ($D_{698}/D_{1376}$) of absorbances at 698 cm$^{-1}$ and 1376 cm$^{-1}$ which were obtained from an infrared absorption spectrum measured by ATR infrared spectroscopic analysis.

Further, the foamed molded products of examples 8 to 15 also exhibited excellent combustion rate results.

Furthermore, the foamed molded products of examples 8 to 15 exhibited superior dimensional change upon heating.

Furthermore, the foamed molded products of examples 8 to 15 also exhibited excellent levels of chemical resistance, and dimensional stability upon heating.

Moreover, the foamed molded products of examples 8 to 15 also exhibited excellent foam moldability.

Accordingly, it has been demonstrated that the present invention is able to remedy the drawbacks associated with both polystyrene type resin foamed molded products and polypropylene type resin foamed molded products, and can provide a foamed molded product that exhibits excellent rigidity, foam moldability, chemical resistance, heat resistance, and self-extinguishing properties.

INDUSTRIAL APPLICABILITY

The present invention remedies the drawbacks associated with polystyrene type resin foamed molded products and polypropylene type resin foamed molded products, and is able to provide a foamed molded product that exhibits excellent rigidity, foam moldability, chemical resistance, heat resistance, and self-extinguishing properties. Accordingly, the present invention is very useful industrially.

The invention claimed is:

1. A carbon-containing modified polystyrene type resin particle, comprising
a carbon-containing polypropylene type resin, and
a polystyrene type resin in an amount of not less than 100 parts by weight but less than 400 parts by weight per 100 parts by weight of said carbon-containing polypropylene type resin, wherein
a polystyrene type resin ratio at a central part of said particle is at least 1.2 times a polystyrene type resin ratio of an overall particle, said polystyrene type resin ratio being calculated by using a ratio ($D_{698}/D_{1376}$) of absorbances at 698 $cm^{-1}$ and 1.376 $cm^{-1}$ which are obtained from an infrared absorption spectrum measured by ATR infrared spectroscopic analysis.

2. A carbon-containing modified polystyrene type resin particle according to claim 1, further comprising not less than 1.5 parts by weight but less than 6 parts by weight of a flame retardant per 100 parts by weight of said carbon-containing polystyrene type resin particle.

3. A carbon-containing modified polystyrene type resin particle according to claim 1, further comprising not less than 1.5 parts by weight but less than 6 parts by weight of a flame retardant, and not less than 0.1 parts by weight but less than 3 parts by weight of as flame retardant assistant, per 100 parts by weight of said carbon-containing polystyrene type resin particle.

4. A carbon-containing modified polystyrene type resin particle according to claim 1, wherein a ratio ($D_{698}/D_{1376}$) of absorbances at 69 $cm^{-1}$ and 1376 $cm^{-1}$ obtained from an infrared absorption spectrum of a panicle surface measured by ATR infrared spectroscopic analysis is within a range from 0.1 to 2.5.

5. A carbon-containing modified polystyrene type resin particle according to claim 1, wherein
an average particle size of a carbon particle within said carbon-containing polypropylene type resin is within a range from 15 to 35 nm prior to incorporation within said polypropylene type resin, and
carbon particles are contained at to 8% by weight.

6. A carbon-containing modified polystyrene type resin particle according to claim 3, wherein
said flame retardant is tri(2,3-dibromopropyl) isocyanate, and
said flame retardant assistant comprises one or more compounds selected from the group consisting of 2,3-dimethyl-2,3-diphenylbutane, 3,4-dimethyl-3,4-diphenylhexane, dicumyl peroxide, and cumene hydroperoxide.

7. A foamable carbon-containing modified polystyrene type resin particle, produced by impregnating a carbon-containing modified polystyrene type resin particle according to claim 1 with a foaming agent.

8. A carbon-containing modified polystyrene type resin foamed particle, produced by pre-foaming a foamable carbon-containing modified polystyrene type resin particle according to claim 7.

9. A carbon-containing modified polystyrene type resin foamed molded product, produced by packing a carbon-containing modified polystyrene type resin foamed particle according to claim 8 into a mold and conducting foam molding.

10. A carbon-containing modified polystyrene type resin foamed molded product according to claim 9, wherein
a shrinkage factor in a dimensional change measurement conducted in accordance with JIS K 6767 under conditions at 80° C. is not more than 1.0%,
a foam expansion ratio is within a range from 20-fold to 40-fold, and
a density is within a range from 0.025 to 0.05 $g/cm^3$.

11. A method of producing a carbon-containing modified polystyrene type resin particle, said method comprising:
dispersing 100 parts by weight of a carbon-containing polypropylene type resin particle, not less than 100 parts by weight but less than 400 parts by weight of a styrene type monomer, and a polymerization initiator within an aqueous suspension containing a dispersant,
heating a resulting dispersion to a temperature at which said styrene type monomer undergoes substantially no polymerization within a range from 45° C. to 70° C., thereby impregnating said carbon-containing polypropylene type resin particle with said styrene type monomer,
performing a first polymerization of said styrene type monomer at a temperature within a range from (T−10)° C. to (T+20)° C., wherein T° C. represents a melting point of said carbon-containing polypropylene type resin particle, and
following said first polymerization, adding a styrene type monomer and a polymerization initiator, and then heating to a temperature within a range from (T−25)° C. to (T+10)° C., thereby impregnating said carbon-containing polypropylene type resin particle with said styrene type monomer while performing a second polymerization,
wherein the temperature of the second polymerization is lower than the temperature of the first polymerization.

12. A method of producing a carbon-containing modified polystyrene type resin particle according to claim 11, further comprising impregnating said resin particle with a flame retardant, either during said second polymerization or after completion of said second polymerization.

13. A method of producing a carbon-containing modified polystyrene type resin particle according to claim 11, further comprising impregnating said resin particle with a flame retardant and a flame retardant assistant, either during said second polymerization or after completion of said second polymerization.

14. A method of producing a carbon-containing modified polystyrene type resin particle according to claim 11, wherein a melting point of a polypropylene type resin within said carbon-containing polypropylene type resin is within a range from 120 to 145° C.

15. A method of producing a carbon-containing modified polystyrene type resin particle according to claim 11, wherein a polypropylene type resin within said carbon-containing polypropylene type resin is a propylene-ethylene copolymer.

16. A method of producing a foamable carbon-containing modified polystyrene type resin particle, said method comprising impregnating a carbon-containing modified polystyrene type resin particle, produced using a method of producing to carbon-containing modified polystyrene type resin particle according to claim 11, with a foaming agent to produce a foamable carbon-containing modified polystyrene type resin particle.

17. A method of producing a carbon-containing modified polystyrene type resin foamed particle, said method comprising heating and pre-foaming a foamable carbon-containing modified polystyrene type resin particle produced using a method of producing a foamable carbon-containing modified polystyrene type resin particle according to claim 16, thereby producing a foamed particle.

18. A method of producing a carbon-containing modified polystyrene type resin foamed molded product, said method comprising:
packing a carbon-containing modified polystyrene type resin foamed particle, produced using a method of producing a carbon-containing modified polystyrene type resin foamed molded product according to claim 17, into a cavity of a molding die, subsequently
performing in-mold foam molding, and then
releasing a foamed molded product from said molding die.

19. A method of producing a carbon-containing modified polystyrene type resin particle according to claim 11, wherein the temperature of the second polymerization is controlled so as to obtain the carbon-containing polypropylene type resin particle in which a polystyrene type resin ratio at a central part of the particle is at least 1.2 times a polystyrene type resin ratio of an overall particle, said polystyrene type resin ratio being calculated by using a ratio ($D_{698}/D_{1376}$) of absorbances at 698 $cm^{-1}$ and 1376 $cm^{-1}$ which are obtained from an infrared absorption spectrum measured by ATR infrared spectroscopic analysis.

\* \* \* \* \*